United States Patent
Nakajima et al.

(10) Patent No.: US 11,972,073 B2
(45) Date of Patent: Apr. 30, 2024

(54) ELECTROSTATIC INPUT APPARATUS AND INPUT DETERMINATION METHOD

(71) Applicant: Alps Alpine Co., Ltd., Tokyo (JP)

(72) Inventors: Satoshi Nakajima, Miyagi-ken (JP); Satoshi Hayasaka, Miyagi-ken (JP); Shinichi Endo, Miyagi-ken (JP); Harry Haryadi, Miyagi-ken (JP); Minoru Watanabe, Miyagi-ken (JP)

(73) Assignee: Alps Alpine Co., Ltd. (JP)

( * ) Notice: Subject to any disclaimer, the term of this patent is extended or adjusted under 35 U.S.C. 154(b) by 0 days.

(21) Appl. No.: 18/158,656

(22) Filed: Jan. 24, 2023

(65) Prior Publication Data

US 2023/0161433 A1 May 25, 2023

Related U.S. Application Data

(63) Continuation of application No. PCT/JP2021/025999, filed on Jul. 9, 2021.

(30) Foreign Application Priority Data

Aug. 24, 2020 (JP) ................................. 2020-140845

(51) Int. Cl.
  *G06F 3/041* (2006.01)
  *G06F 3/044* (2006.01)
(52) U.S. Cl.
  CPC .......... *G06F 3/0416* (2013.01); *G06F 3/0446* (2019.05); *G06F 2203/04104* (2013.01)
(58) Field of Classification Search
  CPC .................... G06F 3/041; G06F 3/0446; G06F 2203/04104
  See application file for complete search history.

(56) References Cited

U.S. PATENT DOCUMENTS

| 2007/0008298 A1* | 1/2007 | Ohta ................... G06F 3/04186 345/173 |
| 2013/0016045 A1* | 1/2013 | Zhao ................... G06F 3/04186 345/173 |

(Continued)

FOREIGN PATENT DOCUMENTS

| JP | 2013-122625 A | 6/2013 |
| JP | 2014-186530 A | 10/2014 |

(Continued)

*Primary Examiner* — Kevin M Nguyen
(74) *Attorney, Agent, or Firm* — Harness, Dickey & Pierce, P.L.C.

(57) ABSTRACT

An electrostatic input apparatus is provided. A measuring unit measures capacitance at a plurality of coordinates of an electrostatic coordinate input unit. A converting unit obtains a reference value of the capacitance and converts the capacitance to difference values according to a distance between the electrostatic coordinate input unit at the coordinates and a finger. A first coordinate calculating unit calculates barycentric coordinates of a contact portion from the difference values for the plurality of coordinates. A cycle determining unit determines whether the difference values at coordinates on a circumference of a circle with a predetermined radius centered on the barycentric coordinates exhibit periodicity of two cycles in one round along the circle. An operation determining unit performs, when the cycle determining unit determines that the difference values exhibit periodicity of two cycles, a determination that an input operation using two or more fingers has been performed.

13 Claims, 22 Drawing Sheets

(56) References Cited

U.S. PATENT DOCUMENTS

2014/0092057 A1     4/2014   Rathnam et al.
2022/0137780 A1*   5/2022   Kim ..................... G06F 3/0447
                                                           345/173

FOREIGN PATENT DOCUMENTS

WO      2009-073606 A2    6/2009
WO      2013-009335 A1    1/2013

* cited by examiner

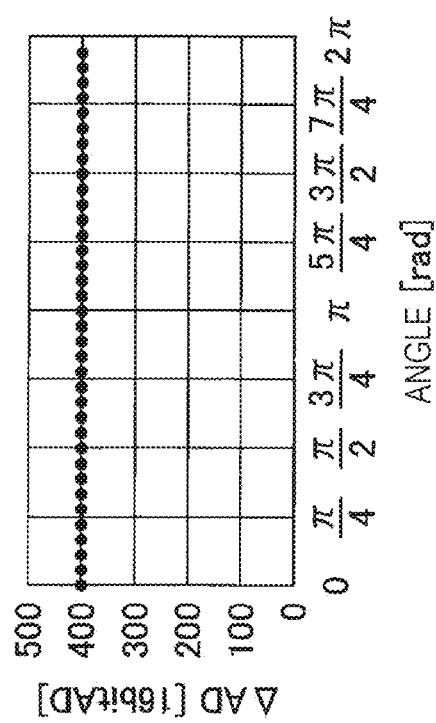
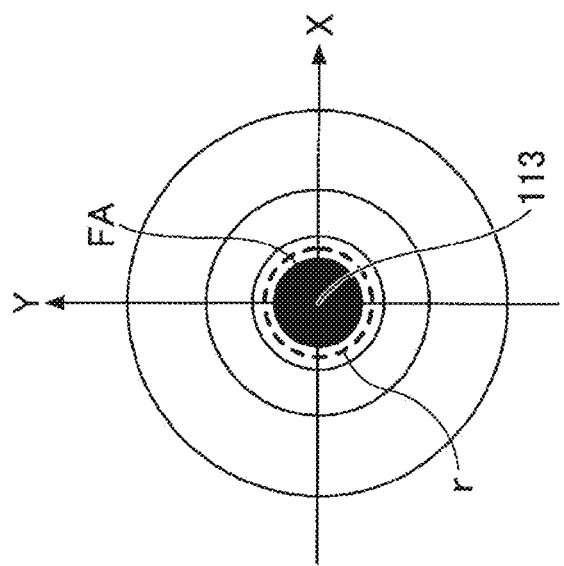
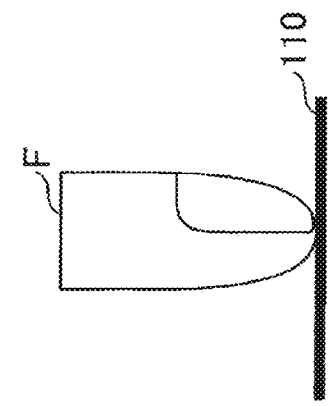

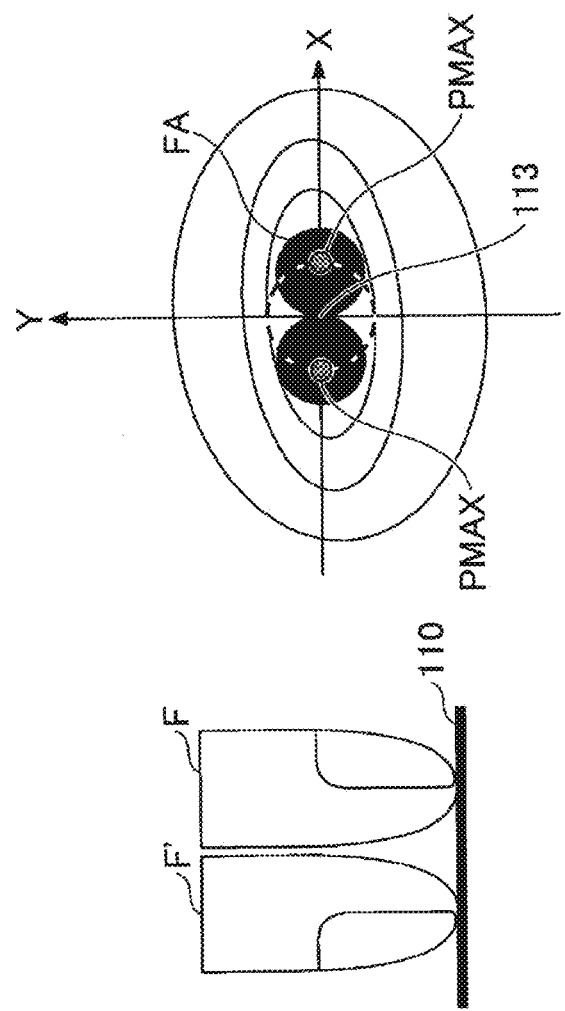
FIG. 4A
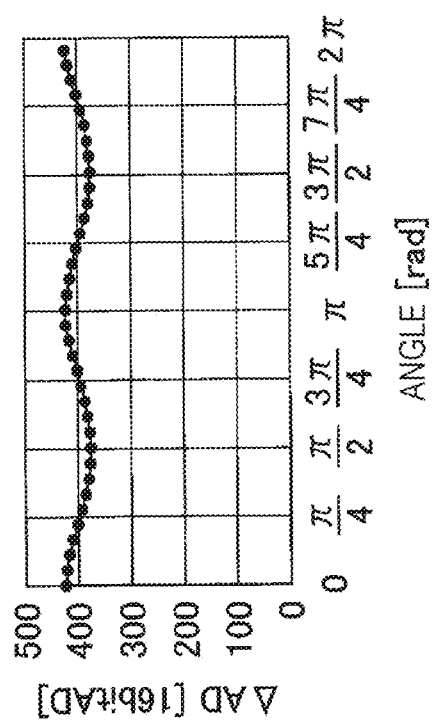
FIG. 4B
FIG. 4C

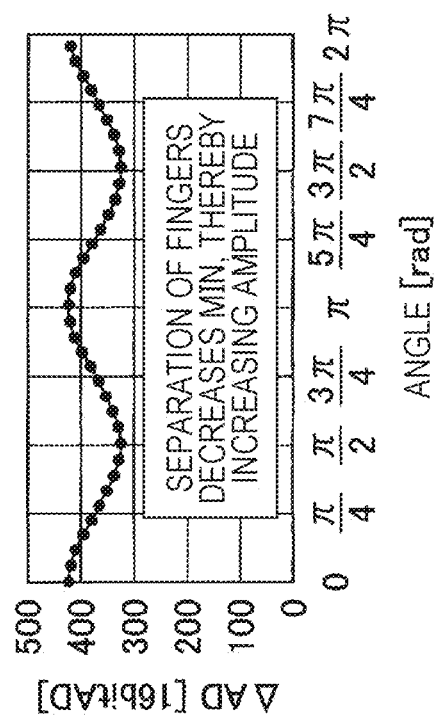
FIG. 5C
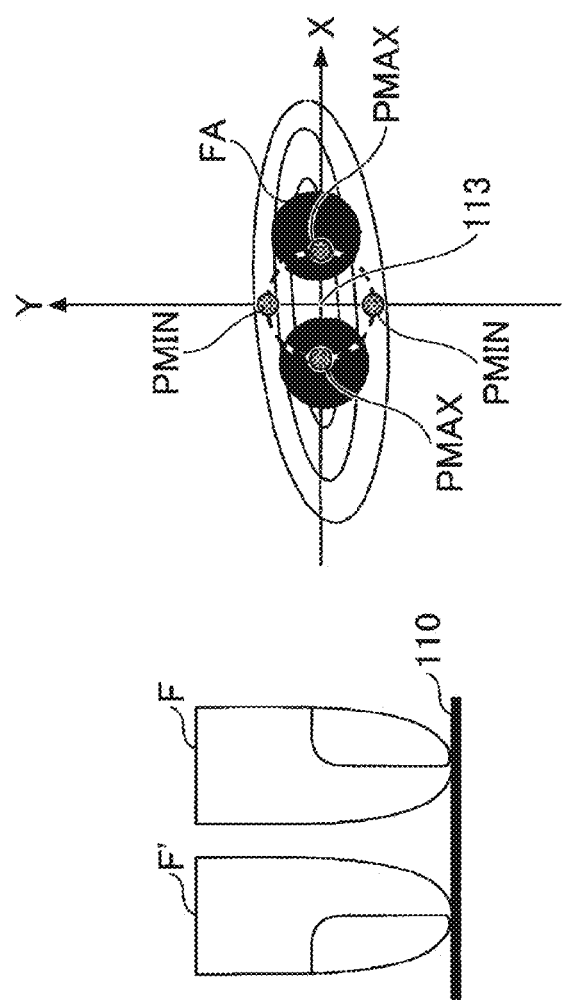
FIG. 5B
FIG. 5A

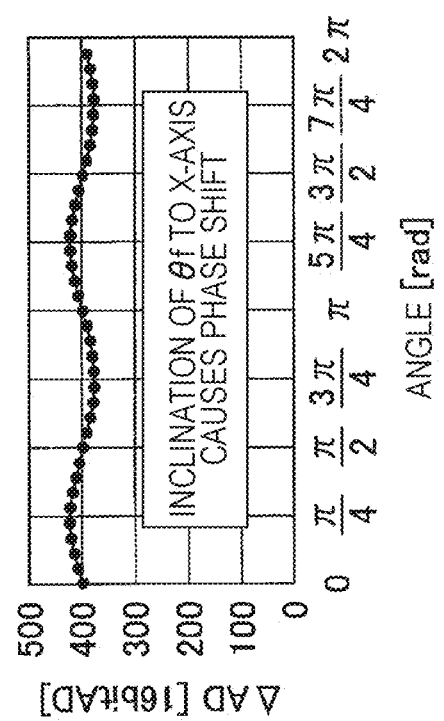
FIG. 6C
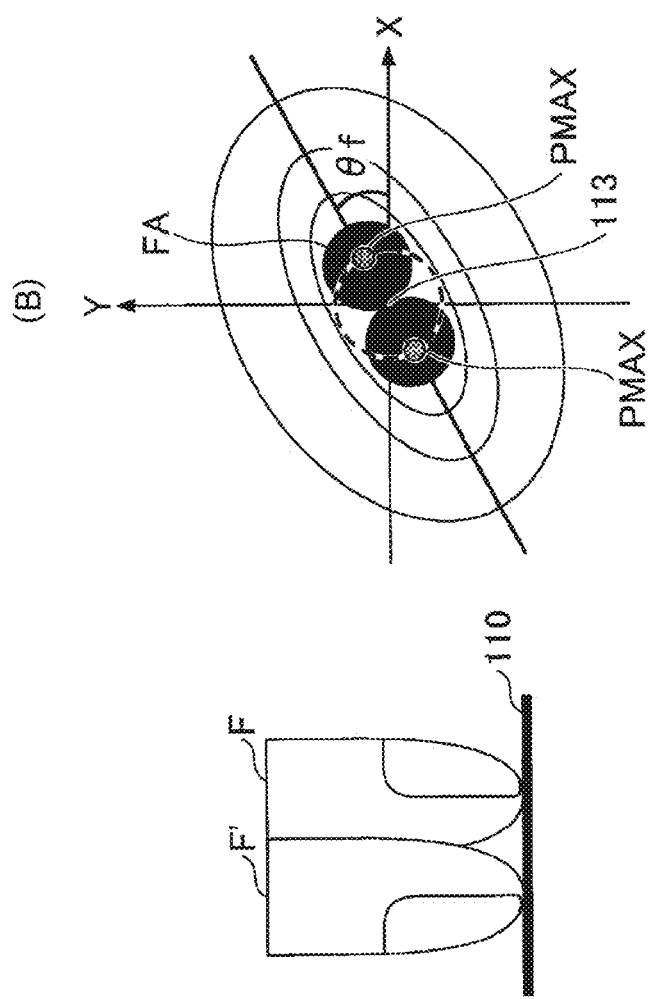
FIG. 6B
FIG. 6A

ELECTROSTATIC INPUT APPARATUS AND INPUT DETERMINATION METHOD

CLAIM OF PRIORITY

This application is a Continuation of International Application No. PCT/JP2021/025999 filed on Jul. 9, 2021, which claims benefit of Japanese Patent Application No. 2020-140845 filed on Aug. 24, 2020. The entire contents of each application noted above are hereby incorporated by reference.

BACKGROUND OF THE INVENTION

1. Field of the Invention

The present invention relates to an electrostatic input apparatus and an input determination method.

2. Description of the Related Art

Capacitance touch pads and touch panels detect fingers, styluses, or the like using a change in capacitance when the fingers or styluses come into contact therewith. The capacitance touch pads and touch panels can detect fingers or styluses even if an insulating plate is placed on the sensor electrode. However, a thicker plate on the sensor electrodes may decrease the resolution, sometimes causing detection of portions of the plate with which two fingers, a styluses, or the like are in contact as a single wide distribution area. Known touch panels in the relate art calculate the degree of flatness of the detected distribution area and determines whether the touch is a single touch or a multi-touch on the basis of the degree of flatness (for example, see Japanese Unexamined Patent Application Publication No. 2014-186530).

The detected distribution area is elliptical in both a state in which one finger extended at an angle is in contact with a touch panel or a touch pad and a state in which a plurality of fingers is in contact with the touch panel or the touch pad. The known input apparatuses determine whether a single touch or a multi-touch according to the degree of flatness of the distribution area and therefore cannot distinguish between a state in which one finger extending obliquely is in contact with the touch panel or the touch pad and a state in which a plurality of fingers is in contact with the touch panel or the touch pad.

SUMMARY OF THE INVENTION

The present invention provides an electrostatic input apparatus capable of distinguishing between a state in which one finger extending obliquely is in contact with an electrostatic coordinate input unit and a state in which a plurality of fingers is in contact with the electrostatic coordinate input unit, as well as an input determination method for the same.

An electrostatic input apparatus according to an aspect of the present invention includes a measuring unit that measures capacitance at a plurality of coordinates of an electrostatic coordinate input unit, a converting unit that obtains a reference value of the capacitance and subtracts the reference value from the capacitance to convert the capacitance to difference values according to a distance between the electrostatic coordinate input unit at the plurality of coordinates and a finger, a first coordinate calculating unit that calculates barycentric coordinates of a contact portion from the difference values for the plurality of coordinates, a cycle determining unit that determines whether the difference values at coordinates on a circumference of a circle with a predetermined radius centered on the barycentric coordinates exhibit periodicity of two cycles in one round along the circle, and an operation determining unit that, when the cycle determining unit determines that the difference values exhibit periodicity of two cycles, determines that an input operation using two or more fingers has been performed.

BRIEF DESCRIPTION OF THE DRAWINGS

FIGS. 2A to 2C are diagrams showing the relationship between the state of one finger erected in performing a manipulated input on the electrostatic coordinate input unit and the measured values of the electrostatic coordinate input unit;

FIGS. 4A to 4C are diagrams showing the state of two fingers in performing a manipulated input on the electrostatic coordinate input unit and the measured values of the electrostatic coordinate input unit;

FIGS. 5A to 5C are diagrams illustrating the planar distribution of the difference values according to the difference in the positional relationship of the two fingers and the difference in the angular characteristics of the difference values;

FIGS. 6A to 6C are diagrams illustrating the planar distribution of the difference values according to the difference in the positional relationship of the two fingers and the difference in the angular characteristics of the difference values;

FIG. 9 is a diagram showing a correction table;

DESCRIPTION OF THE PREFERRED EMBODIMENTS

Embodiments of an electrostatic input apparatus and an input determination method of the present invention will be described hereinbelow.

First Embodiment

Figure 1:
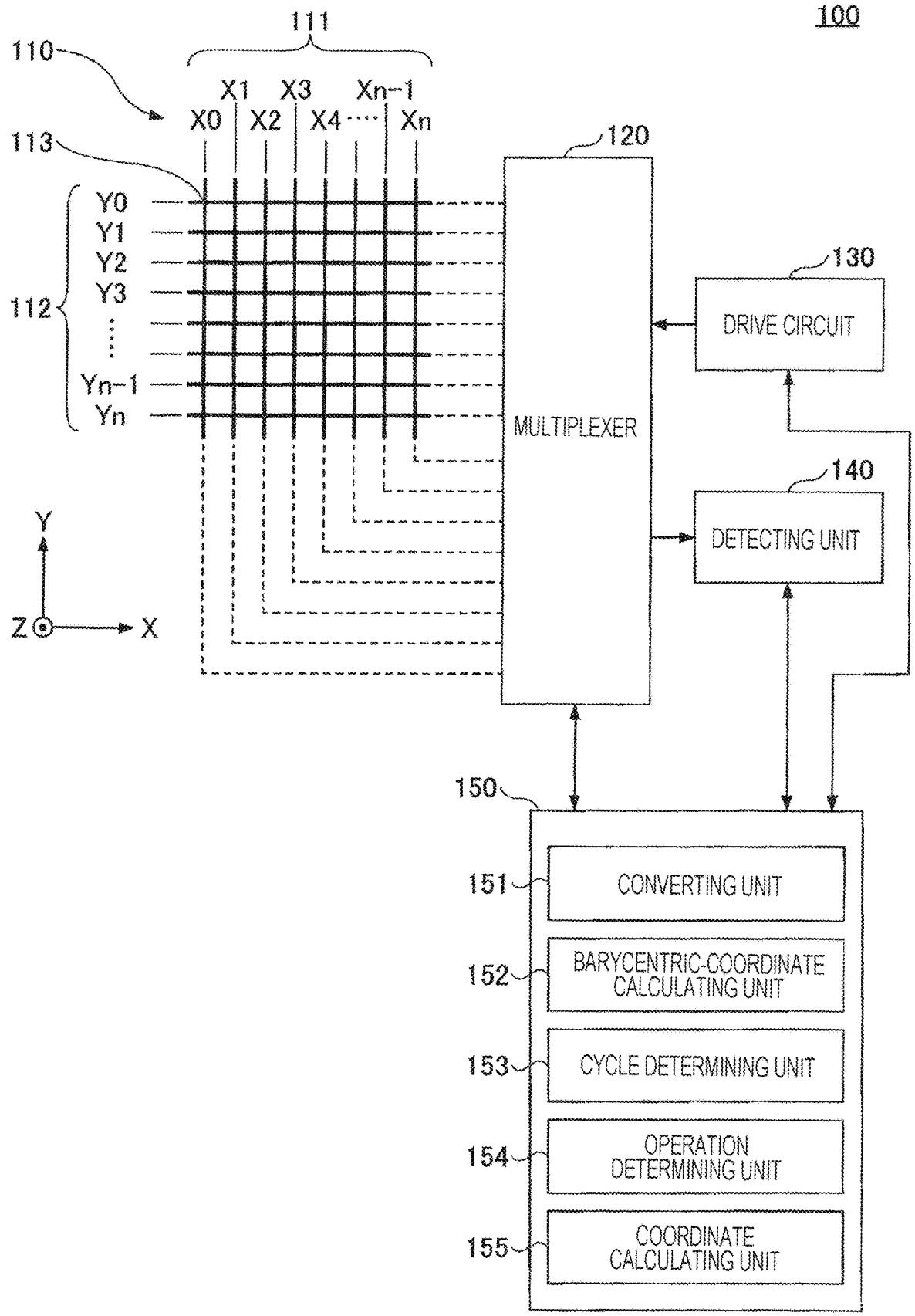
FIG. 1 is a diagram showing an electrostatic input apparatus according to a first embodiment.

FIG. 1 is a diagram showing an electrostatic input apparatus 100 according to a first embodiment. The following is described using the X-Y-Z coordinate system. In the following, the plan view refers to an X-Y plane view. The −Z direction is a direction adjacent to the electrostatic input apparatus. The -Z direction is referred to as "lower side" or "below" for the convenience of description. The +Z direction is a direction remote from the electrostatic input apparatus. The +Z direction is referred to as "upper side" or "above" for the convenience of description.

The electrostatic input apparatus 100 includes an electrostatic coordinate input unit 110, a multiplexer 120, a drive circuit 130, a detecting unit 140, and a controller 150.

The electrostatic coordinate input unit 110 includes multiple electrodes 111 that detect positions in the X direction and multiple electrodes 112 that detect positions in the Y direction. The multiple electrodes 111 and 112 are each made of a light-transmissive electrically conductive material, such as indium tin oxide (ITO), on the upper surface or the lower surface of a transparent substrate (not shown). The multiple electrodes 111 include electrodes X0, X1, X2, X3, . . . , Xn. The electrodes X0, X1, X2, X3, . . . , Xn are arranged in the X direction at a constant pitch and extend in the Y direction. The multiple electrodes 112 include electrodes Y0, Y1, Y2, Y3, . . . , Yn. The electrodes Y0, Y1, Y2, Y3, . . . , Yn are arranged in the Y direction at a constant pitch and extend in the X direction. The portions at which the multiple electrodes 111 and the multiple electrodes 112 cross each other in plan view are shown as intersections 113.

The multiplexer 120 is a switching circuit that connects the multiple electrodes 111 (X0, X1, X2, X3, . . . , Xn) and the multiple electrodes 112 (Y0, Y1, Y2, Y3, . . . , Yn) to the drive circuit 130 or the detecting unit 140.

The drive circuit 130 outputs driving power to the groups of the multiple electrodes 111 X0, X1, X2, X3, . . . , Xn) and the multiple electrodes 112 (Y0, Y1, Y2, Y3, . . . , Yn) in order.

When driving power is supplied to the multiple electrodes 111 (X0, X1, X2, X3, . . . , Xn) by the drive circuit 130, the detecting unit 140 measures electric currents flowing through the multiple electrodes 112 (Y0, Y1, Y2, Y3, . . . , Yn) and calculates the capacitance at the individual intersections 113. When driving power is supplied to the multiple electrodes 112 (Y0, Y1, Y2, Y3, . . . , Yn) by the drive circuit 130, the detecting unit 140 measures electric currents flowing through the multiple electrodes 112 (X0, X1, X2, X3, . . . , Xn) and calculates the capacitance at the individual intersections 113. The capacitance at each intersection 113 measured by the detecting unit 140 is capacitance generated between the electrodes 111 and 112 at each intersection 113.

The capacitance generated at each intersection 113 is influenced by a conductor (finger) near the intersection 113. The capacitance value of each intersection 113 is input to the converting unit 151 of the controller 150.

The controller 150 includes a converting unit 151, a barycentric-coordinate calculating unit 152, a cycle determining unit 153, an operation determining unit 154, and a coordinate calculating unit 155.

When the capacitance measured by the detecting unit 140 is less than a threshold, the converting unit 151 finds the average value of the capacitance at the intersections 113 measured with the detecting unit 140 multiple times in time series. The converting unit 151 obtains the average value as a reference value when the electrostatic coordinate input unit 110 measures the capacitance. The converting unit 151 subtracts the reference value from the measured capacitance value measured for each intersection 113 by the detecting unit 140 and converts the value to a difference value of the capacitance (hereinafter referred to as "difference value") according to the distance between the electrostatic coordinate input unit 110 and the finger at each intersection 113. The reference value is obtained for each intersection 113.

The barycentric-coordinate calculating unit 152 is an example of a first coordinate calculating unit. The barycentric-coordinate calculating unit 152 calculates the center of gravity on the basis of the difference values at the individual intersections 113 output from the converting unit 151. "The center of gravity" in the embodiments of the present invention is the center of gravity when the difference value of each intersection 113 is regarded as the mass of the intersection 113. That is, "the center of gravity" in the embodiments of the present invention is the center of the distribution of the capacitance.

The cycle determining unit 153 determines whether difference values at the intersections 113 of the electrodes 111 and 112 on the circumference of a circle with a predetermined radius centered on the barycentric coordinates calculated by the barycentric-coordinate calculating unit 152 exhibit periodicity of two cycles in one round along the circle. The term "periodicity of two cycles in one round" indicates that the component of the sine wave at intervals of π[rad] is large, as shown in FIG. 4C. The processing details of the cycle determining unit 153 will be described below with reference to FIGS. 2A to 2C to FIGS. 4A to 4C.

If the cycle determining unit 153 determines that the difference values at the intersections 113 on the circumference of the circle with a predetermined radius centered on the barycentric coordinates calculated by the barycentric-coordinate calculating unit 152 exhibit periodicity of two cycles, the operation determining unit 154 determines that an input operation using a plurality of fingers has been performed.

If the operation determining unit 154 determines that an input operation using a plurality of fingers has been performed, then the coordinate calculating unit 155 calculates the central coordinates of each of the plurality of fingers. If the operation determining unit 154 determines that an input operation using one finger has been performed, then the coordinate calculating unit 155 outputs the barycentric coordinates calculated by the barycentric-coordinate calculating unit 152 as the central coordinates of the finger.

Figures 3A, 3B, 3C:
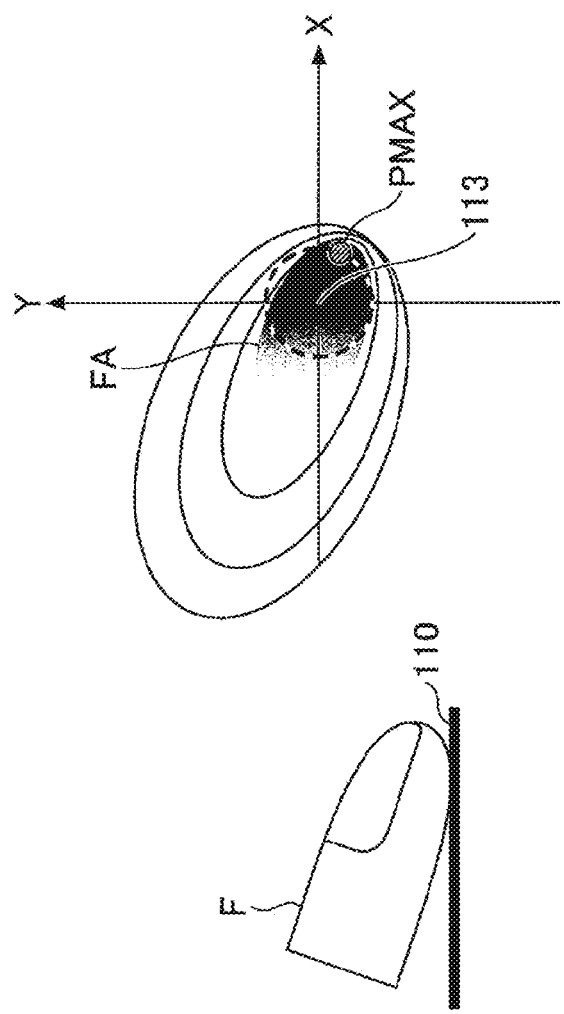
FIGS. 3A to 3C are diagrams showing the state of one finger angled in performing a manipulated input on the electrostatic coordinate input unit and the measured values of the electrostatic coordinate input unit.

FIGS. 2A to 2C to FIGS. 4A to 4C are diagrams showing the relationship between the state of one finger F in performing a manipulated input on the electrostatic coordinate input unit 110 and the measured values of the electrostatic coordinate input unit 110. FIG. 2A shows a state in which a manipulated input is performed with one finger F erected. FIG. 3A shows a state in which a manipulated input is performed with one finger F angled. FIG. 4A shows a state in which a manipulated input is performed with two fingers F and F' erected.

FIGS. 2B, 3B, and 4B show the planar distribution of the difference values at the intersections 113. The planar distribution of the difference values is expressed as contour lines (solid closed curves) corresponding to the difference values. An area FA indicating the position of the finger F detected by the detecting unit 140 (hereinafter referred to as "finger area FA") and a measurement circle (dashed circle) with a radius r centered on the center of gravity of the finger area FA are shown together. The finger area FA is shown in monotone gradation. The black portion is a portion where the finger F is in contact with the electrostatic coordinate input unit 110. The gray portion is a portion where the finger F is close to the electrostatic coordinate input unit 110. The measurement circle is a circle centered on the center of gravity. The diameter of the measurement circle is the average distance between the centers of two fingers that are in contact with each other. An example of the diameter of the measurement circle is 18 mm (the radius is 9 mm). The origin of the X-Y coordinates in FIGS. 2B, 3B, and 4B is the center of gravity of the finger area FA. The radius of the measurement circle is not limited to 9 mm. Radii of 8 mm to 10 mm of the measurement circle provides sufficient accuracy. The radius of the measurement circle does not necessarily have to be fixed. For example, the radius may be the distance from the center of gravity to a position where the difference value is the maximum.

FIGS. 2C, 3C, and 4C show the angular characteristics of the difference values. The horizontal axis represents the angles, and the vertical axis represents the difference values on the measurement circle. The angles indicate positions on the measurement circle. The angles are set counterclockwise, with a point on the positive section of the X-axis as 0 [rad]. For this reason, the angle of a point on the positive section of the Y-axis on the measurement circle is π/2 [rad], the angle of a point on the negative section of the X-axis is π[rad], and the angle of a point on the negative section of the Y-axis is 3π/18 [rad]. The difference values shown in FIGS. 2C, 3C, and 4C are difference values at sampling points at intervals of π/18 [rad] from the point of 0 [rad] on the measurement circle. If the intersection 113 is not present at the sampling point, a value obtained by performing linear approximation of the difference values at a multiple intersections 113 around the sampling point is used.

In a state in which a manipulated input is performed, with one finger F erected, as shown in FIG. 2A, the finger area FA in which the output of the converting unit 151 is higher than or equal to a predetermined threshold is circular, and the contour lines are concentric, as shown in FIG. 2B. In this case, the angular characteristics of the difference values are flat, as shown in FIG. 2C. This is because the difference values at the individual sampling points on the measurement circle are equal.

In a state in which a manipulated input is performed, with one finger F angled, as shown in FIG. 3A, the finger area FA in which the output of the converting unit 151 is higher than or equal to the predetermined threshold is elliptical, and the contour lines are elliptical, as shown in FIG. 3B. The interval between the contour lines is narrowest at the distal end of the finger F and widest at the base of the finger F (the side near the back of the hand). In this case, the angular characteristics of the difference values exhibit periodicity of one cycle in one round along the measurement circle, as shown in FIG. 3C, because a point PMAX at which the difference value is greatest in one round along the measurement circle is one.

In a state in which a manipulated input is performed, with two fingers F and F' erected, as shown in FIG. 4A, the finger area FA in which the output of the converting unit 151 is higher than or equal to the predetermined threshold includes two circles, and the contour lines are elliptical, as shown in FIG. 4B. The interval between the contour lines is wider in the direction in which the two fingers F and F' are connected (X direction) and narrower in the direction different by π/2 [rad] (Y direction). In this case, the angular characteristics of the difference values exhibit periodicity of two cycles in one round along the measurement circle, as shown in FIG. 4C, because there are two points PMAX at which the difference value is maximum in one round along the measurement circle. Since the measurement circle is a circle corresponding to the size of one finger, the center of gravity of the finger area FA of the two fingers F and F' is positioned between the two fingers F and F'. For this reason, the center of the two fingers F and F' is positioned on the measurement circle, and therefore two points PMAX are provided, and periodicity of two cycles is provided in one round along the measurement circle.

Thus, obtaining the angular characteristics of the difference values using the measurement circle, as shown in FIGS. 2A to 2C to FIGS. 4A to 4C, allows distinguishing among a state in which a manipulated input is performed with one finger F erected, as shown in FIG. 2A, a state in which a manipulated input is performed with one finger F angled, as shown in FIG. 3A, and a state in which a manipulated input is performed with two fingers F and F' erected, as shown in FIG. 4A.

In Fourier series expansion, the following relations of Eqs. (1) to (3) hold, where f(x) is a function of cycle T. where $$f(x) = \frac{a0}{2} + \sum_{n=1}^{\infty}\left(an\cos\frac{2\pi nx}{T} + bn\sin\frac{2\pi nx}{T}\right) \quad (1)$$

where $$an = \frac{2}{T}\int_0^T f(x)\cos\frac{2\pi nx}{T}dx \quad (2)$$

$$bn = \frac{2}{T}\int_0^T f(x)\sin\frac{2\pi nx}{T}dx \quad (3)$$

where x is replaced with θ. The difference value f(θ) of the electrostatic coordinate input unit 110 at a fixed distance r from the center of the finger area FA of the two fingers F and F' (see FIG. 4B) is found using Fourier series expansion, where f(θ) represents the measurement circle. The value f(θ) is approximated using Eq. (4), where cycle T=2π, and n in Eqs. (1) to (3)=2.

$$f(\theta) = \frac{a0}{2} + a2\cos 2\theta + b2\sin 2\theta \quad (4)$$

where coefficients a0, a2, and b2 are expressed as Eqs. (5) to (7), respectively. Coefficients a2 and b2 are coefficients that identify vectors representing the positions of the respective coordinates PF1 and PF2 of the two fingers F and F', described below with reference to FIG. 7.

$$a0 = \frac{1}{\pi} \int_0^{2\pi} f(\theta) d\theta \qquad (5)$$

$$a2 = \frac{1}{\pi} \int_0^{2\pi} f(\theta)\cos 2\theta d\theta \qquad (6)$$

$$b2 = \frac{1}{\pi} \int_0^{2\pi} f(\theta)\sin 2\theta d\theta \qquad (7)$$

Referring to FIGS. 4A to 4C and also FIGS. 5A to 5C and FIGS. 6A to 6C, the planar distribution of the difference values according to the difference in the positional relationship of the two fingers F and F' and the difference in the angular characteristics of the difference values will be described. FIGS. 5A to 5C and FIGS. 6A to 6C are diagrams illustrating the planar distribution of the difference values according to the difference in the positional relationship of the two fingers F and F' and the difference in the angular characteristics of the difference values.

In a state in which a manipulated input is performed with the two fingers F and F' separated and erected, as shown in FIG. 5A, the finger area FA in which the output of the converting unit 151 is higher than or equal to a predetermined threshold is formed of two circles, as shown in FIG. 5B, while the contour lines form ellipses with longer major axes than the ellipses shown in FIG. 4B. In this case, the difference values at points PMIN with smallest difference values on the measurement circle are smaller than those in FIG. 4B. For this reason, the amplitude in periodicity of two cycles in one round along the measurement circle is smaller than that of FIG. 4C, as shown in FIG. 5C.

In a state in which a manipulated input is performed with the two fingers F and F' attached to each other and erected at an angle with respect to the X-axis, as shown in FIG. 6A, the finger area FA in which the output of the converting unit 151 is higher than or equal to a predetermined threshold is formed of two circles, whereas the major axes of the elliptic contour lines form an angle of θf (θf>0) with respect to the X-axis, as shown in FIG. 6B. In this case, the angles of the points PMAX at which the difference value is maximum on the measurement circle shift, and as a consequence, the phase of the periodicity of two cycles in one round along the measurement circle shifts, as shown in FIG. 6C. The angle θof is an angle of a polar coordinate system and is formed by the X-axis and a straight line connecting the positions of the respective coordinates PF1 and PF2 of the two fingers F and F'.

The measurement circle is represented by fθ expressed as Eq. (8).

$$f(\theta) = \frac{A0}{2} + A2\cos(2(\theta - \theta f)) \qquad (8)$$

Modification of Eq. (8) provides Eq. (9), where A2, sin2θf, cos2θf are expressed as Eqs. (10) to (12), respectively. The value A2 in Eq. (10) represents the magnitude of a vector determined by the coefficients a2 and b2 that identify the vector. The coefficients a1 and a2 are of the real parts of the Fourier series expanded terms. The coefficients b1 and b2 are of the imaginary parts of the Fourier series expanded terms. Values A0, A1, and A2 are the absolute values of the complex number including the real part and the imaginary part of each Fourier series expanded term.

$$f(\theta) = \frac{A0}{2} + b2\sin 2\theta + a2\cos 2\theta \qquad (9)$$

$$A2 = \sqrt{a_2^2 + b_2^2} \qquad (10)$$

$$\sin 2\theta f = \frac{b2}{\sqrt{a_2^2 + b_2^2}} \qquad (11)$$

$$\cos 2\theta f = \frac{a2}{\sqrt{a_2^2 + b_2^2}} \qquad (12)$$

The value θf can be expressed as Eq. (13) using θf in Eqs. (11) and (12).

$$\theta f = \frac{\arctan\left(\frac{b2}{a2}\right)}{2} \qquad (13)$$

Figure 7:
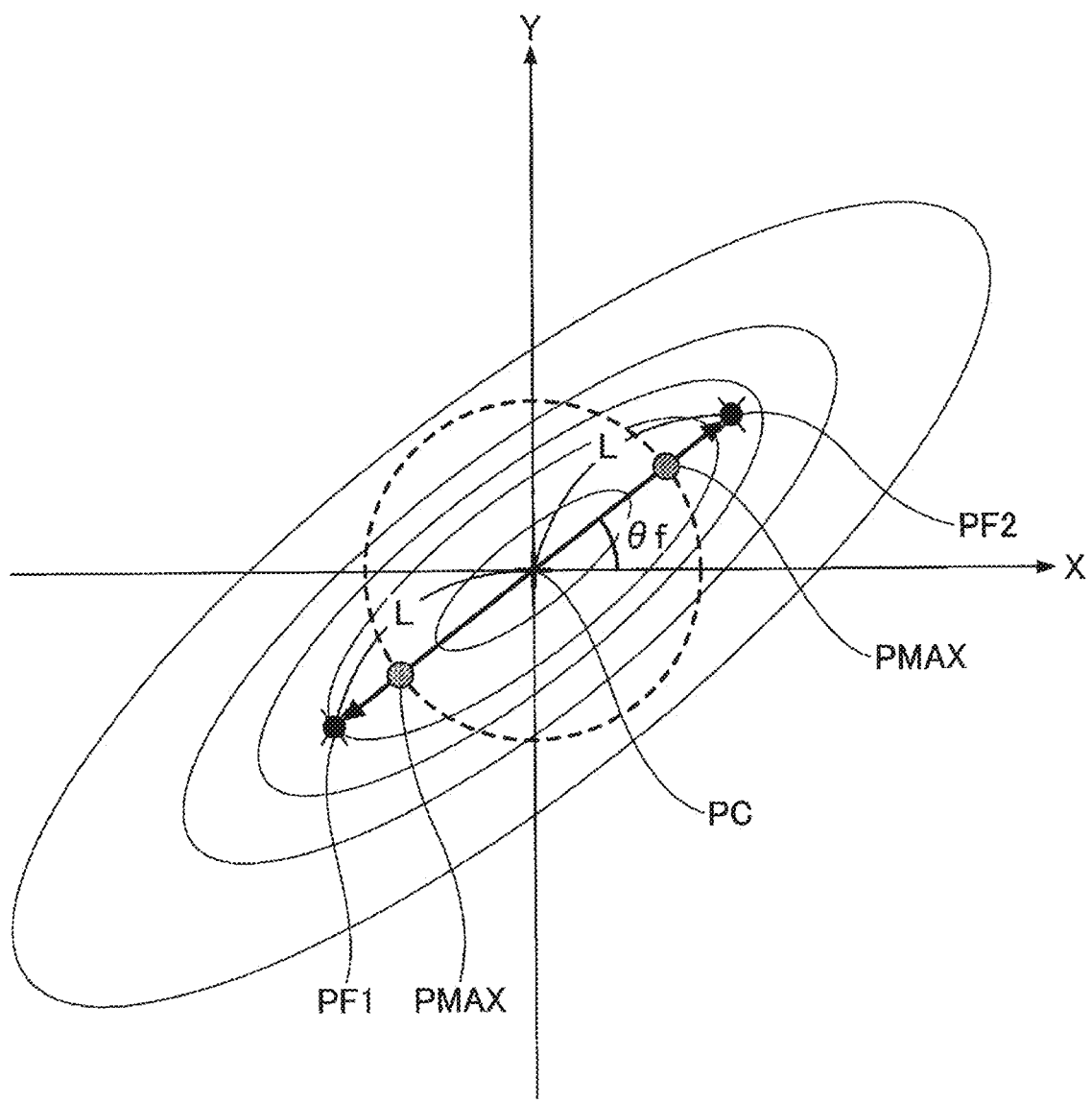
FIG. 7 is a diagram illustrating the respective coordinates of the two fingers.

The coordinates of the two fingers F and F' can be obtained using the results of above calculation. FIG. 7 is a diagram illustrating the respective coordinates PF1 and PF2 of the two fingers F and F'. FIG. 7 shows the measurement circle, the center of gravity PC of the finger area FA, the points PMAX at which the difference value is maximum, and the respective coordinates PF1 and PF2 of the two fingers F and F' (the finger area FA is omitted). In FIG. 7, the origin of the X-Y coordinates is the center of gravity PC of the finger area FA. The coordinates PF1 and PF2 are expressed using the distance L from the center of gravity PC to the position of each of the respective coordinates PF1 and PF2 of the two fingers F and F' and the angle θf. The distance L can be obtained using Eq. (14). The values of coefficients K1 and K2 should be adjusted so that the double of vectors PF1 and PF2 is equal to the distance between the two fingers F and F', where the vectors PF1 and PF2 are directed from the center of gravity PC of the finger area FA to the coordinates PF1 and PF2 of the fingers F and F', respectively. Thus, the distance L between the two fingers F and F' can be obtained as the distance twice the length of each of the vectors PF1 and PF2 using Eq. (14).

$$L = K1 \times A2 + K2 \qquad (14)$$

Accordingly, distinguishing the states in FIG. 4C as well as FIGS. 5C and 6C from the states in FIGS. 2C and 3C allows an operation using the two fingers F and F' to be identified, and the coordinates PF1 and PF2 of the two fingers F and F' to be found.

Figure 8:
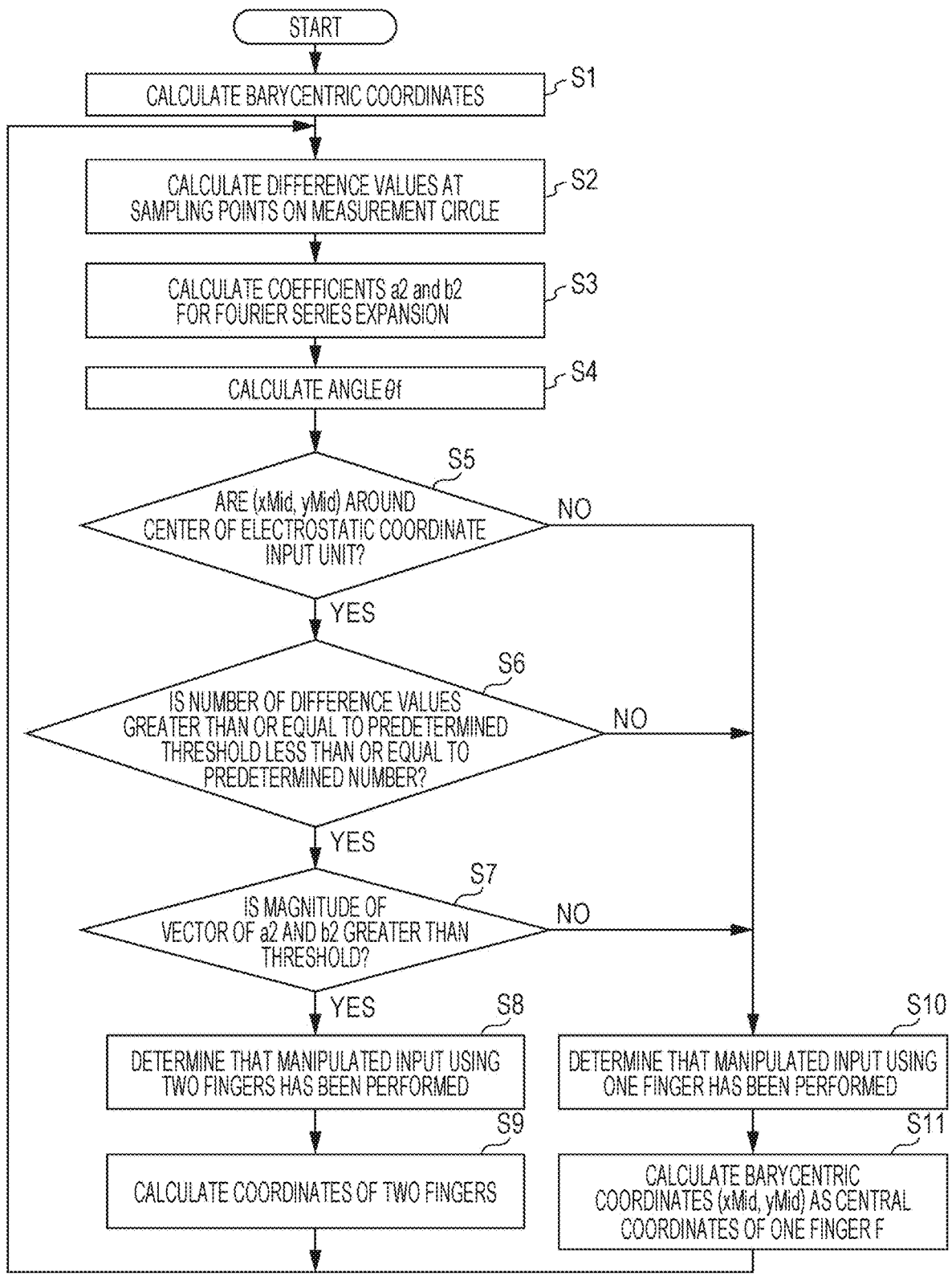
FIG. 8 is a flowchart for the processing of an input determination method of the first embodiment.

FIG. 8 is a flowchart for the processing of an input determination method of the first embodiment. When the processing is started, the barycentric-coordinate calculating unit 152 calculates the barycentric coordinates on the basis of the output from the converting unit 151 (step S1). The coordinates calculated at step S1 are the barycentric coordinates (xMid, yMid) of the finger area FA in which the output of the converting unit 151 is higher than or equal to a predetermined threshold.

The cycle determining unit 153 calculates difference values at the sampling points at intervals of π/18 [rad] from the point of 0 [rad] on the measurement circle (step S2). If the intersections 113 between the electrodes 111 and the electrodes 112 are present at the sampling points, the difference values at the sampling points are difference values at the intersections 113. If the intersections 113 are not present at the sampling points, the cycle determining unit 153 uses values obtained by linearly approximating the difference values at a multiple intersections 113 around the sampling points.

The cycle determining unit 153 calculates the coefficients a2 and b2 in the Fourier series expanded second term from the values at the sampling points of the measurement circle using Eqs. (6) and (7) (step S3).

The cycle determining unit 153 calculate the angle θf from Eq. (13) using the coefficients a2 and b2 calculated at step S3 (step S4).

The operation determining unit 154 determines whether the barycentric coordinates (xMid, yMid) calculated at step S1 are within a predetermined range of the central portion of the electrostatic coordinate input unit 110 (step S5). This is because, if the barycentric coordinates (xMid, yMid) are not within the predetermined range of the central portion of the electrostatic coordinate input unit 110, the measurement circle is out of the measurable range of the electrostatic coordinate input unit 110, and as a consequence, the difference values at the sampling points of the measurement circle cannot be obtained.

If the operation determining unit 154 determines that the barycentric coordinates (xMid, yMid) are within the predetermined range of the central portion of the electrostatic coordinate input unit 110 (S5: YES), then the operation determining unit 154 determines whether the number of difference values greater than or equal to a predetermined threshold (a threshold for difference values) of the difference values detected in the entire electrostatic coordinate input unit 110 is less than or equal to a predetermined number (step S6). If the number of difference values greater than or equal to the predetermined threshold is greater than the predetermined number, the operation is not performed using two fingers, for example, using three or more fingers or the palm of a hand.

If the operation determining unit 154 determines that the number of difference values greater than or equal to the predetermined threshold (the threshold for difference values) is less than or equal to the predetermined number (S6: YES), then the operation determining unit 154 determines whether the magnitude of the vector A2 identified by the coefficients a2 and b2 is greater than a predetermined threshold (a threshold for the magnitude of the vector) (step S7). If two fingers are used for operation, the vector A2 is greater than the predetermined threshold. Even if one finger is used for operation, the vector A2 does not come to zero because of a measurement error.

If the operation determining unit 154 determines that the magnitude of the vector is greater than the predetermined threshold (the threshold for vectors) (S7: YES), then the operation determining unit 154 determines that the manipulated input has been performed using two fingers (step S8).

The coordinate calculating unit 155 calculates two coordinates obtained from the barycentric coordinates (xMid, yMid), the distance L, and the angle θf as the central coordinates of the fingers F and the finger F' (step S9).

If at step S5 the operation determining unit 154 determines that the barycentric coordinates (xMid, yMid) are out of the predetermined range of the central portion of the electrostatic coordinate input unit 110 (S5: NO), then the operation determining unit 154 determines that the manipulated input is performed using one finger (step S10). If at step S6 the operation determining unit 154 determines that the number of difference values greater than or equal to the predetermined threshold (the threshold for difference values) is not less than or equal to the predetermined number (S6: NO), and if at step S7 the operation determining unit 154 determines that the magnitude of the vector is not greater than or equal to the predetermined threshold (the threshold for vectors) (S7: NO), then the operation determining unit 154 determines that the manipulated input has been performed using one finger (step S10).

The coordinate calculating unit 155 calculates the barycentric coordinates (xMid, yMid) calculated at step S1 as the central coordinates of the one finger F (step S11). Thus, the series of processes ends.

Determining whether periodicity of two cycles can be obtained in one round along the measurement circle allows determining whether the manipulated input has been performed using two fingers. This allows providing the electrostatic input apparatus 100 capable of distinguishing between a state in which one finger extended diagonally is in contact with the electrostatic coordinate input unit and a state in which two or more fingers are in contact with the electrostatic coordinate input unit, and an input determination method for the same.

This is a configuration of determining that a manipulated input has been performed using two fingers when the values of the coefficients a2 and b2 are somewhat great, and the value A2 is somewhat great. Alternatively, the following configuration may be used.

The value A0 is determined using Eq. (15). The value AO is the direct-current component of capacitance detected by the detecting unit 140. The value AO is expressed using a0.

$$A0 = \frac{a0}{2} \qquad (15)$$

When the value A0 is obtained, and if the ratio A2/A0 between the value A2 of the magnitude of the vector and the direct-current component A0 is relatively high (higher than a first predetermined ratio), it may be determined that the manipulated input has been performed using two fingers. The determination using the ratio between the direct-current component A0 and the value A2 representing the magnitude of the vector ensures stabler determination accuracy against variations in the sensitivity of the electrostatic coordinate input unit 110.

Figure 9:
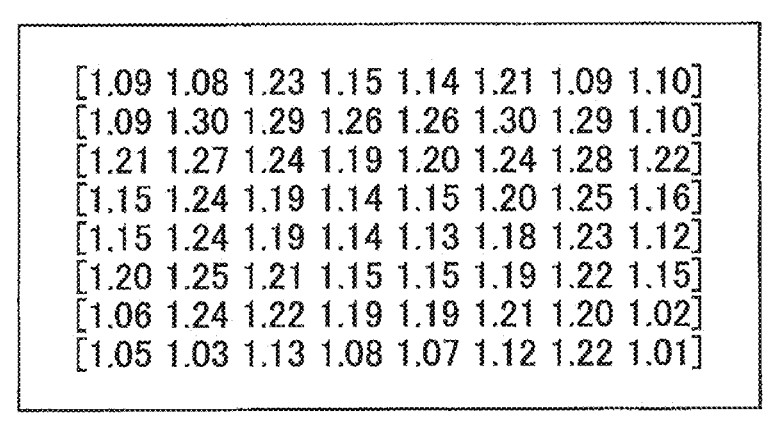

Wide variations of the electrodes 111 and 112 of the electrostatic coordinate input unit 110 cause variations in the detection sensitivity at the intersections 113 detected by the detecting unit 140, causing variations in the difference values converted by the converting unit 151. In such a case, a correction table as shown in FIG. 9 may be provided, with which the difference values calculated for the intersections 113 may be corrected by the converting unit 151. FIG. 9 shows a correction table. In one example, a correction table in which 64 correction values for use when eight intersections 113 are arrayed in each of the X direction and the Y direction are arrayed in matrix. Since the converting unit 151 corrects the difference values, which the converting unit 151 calculates for the intersections 113 on the basis of the capacitance input from the detecting unit 140 to the controller 150, by multiplying the difference values by correction values, finger central coordinates can be detected with higher accuracy.

Second Embodiment

Figure 10:
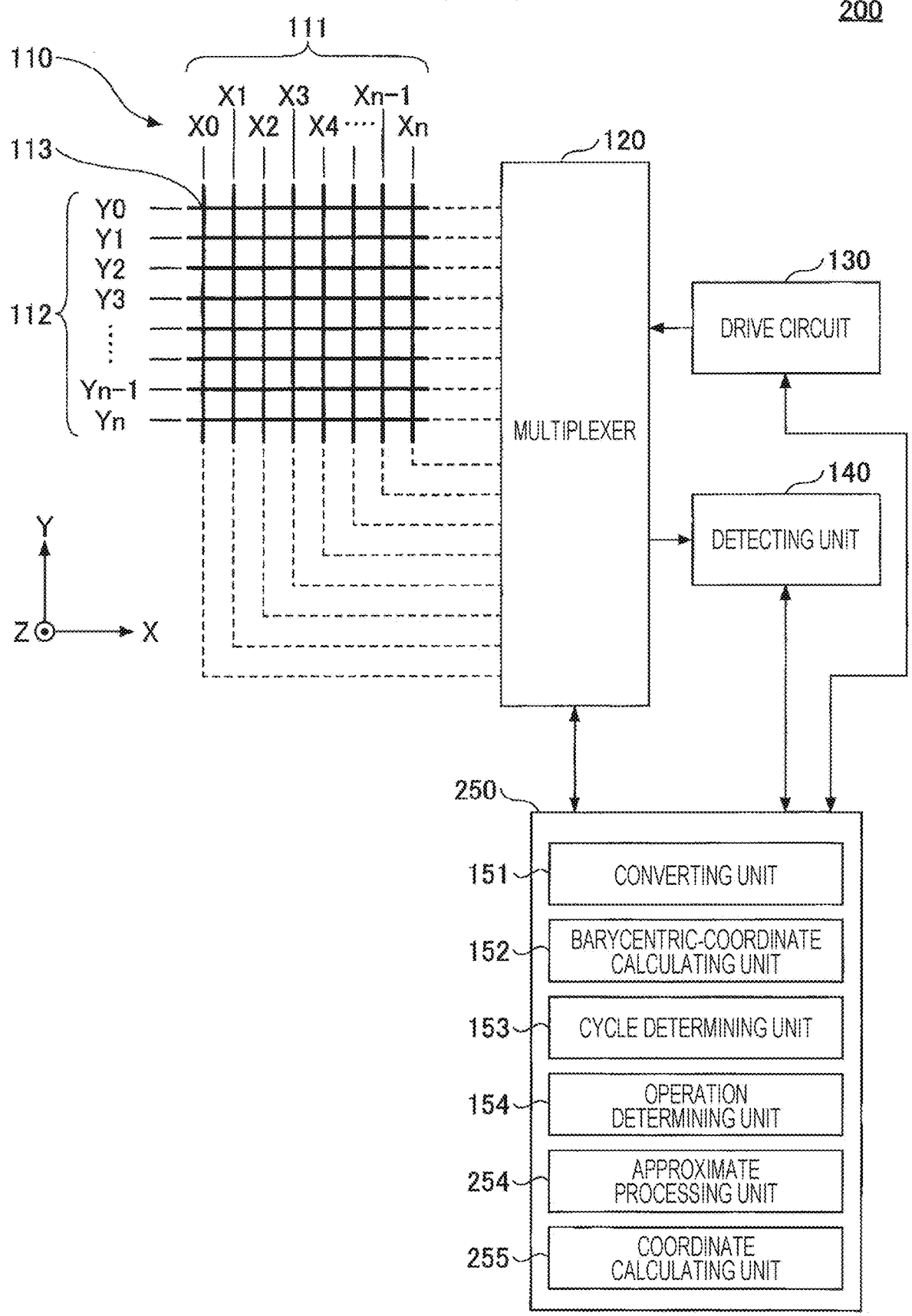
FIG. 10 is a diagram showing an electrostatic input apparatus according to a second embodiment.

FIG. 10 is a diagram illustrating an electrostatic input apparatus 200 according to a second embodiment.

The electrostatic input apparatus 200 includes an electrostatic coordinate input unit 110, a multiplexer 120, a drive circuit 130, a detecting unit 140, and a controller 250. The electrostatic input apparatus 200 is configured such that the controller 150 of the electrostatic input apparatus 100 of the first embodiment is replaced with the controller 250. Since the other configurations are the same as those of the electrostatic input apparatus 100 of the first embodiment, like components are denoted by the same reference signs, and redundant descriptions are omitted.

The controller 250 includes a converting unit 151, a barycentric-coordinate calculating unit 152, a cycle determining unit 153, an operation determining unit 154, an approximate processing unit 254, and a coordinate calculating unit 255. The converting unit 151, the barycentric-coordinate calculating unit 152, the cycle determining unit 153, and the operation determining unit 154 are the same as the converting unit 151, the barycentric-coordinate calculating unit 152, the cycle determining unit 153, and the operation determining unit 154 of the controller 150 of the first embodiment, respectively.

When the cycle determining unit 153 determines that the difference values exhibit periodicity of two cycles, the approximate processing unit 254 performs approximate processing for approximating the outline of the range in which coordinates at which difference values converted by the converting unit 151 exceed a threshold are present to an ellipse. This approximate processing will be described below with reference to FIGS. 12A and 12B to FIGS. 14A and 14B.

The coordinate calculating unit 255 is an example of a second coordinate calculating unit, which calculates a position nearer to the center of the ellipse obtained by the approximate processing performed by the approximate processing unit 254 than the two focal points of the ellipse as the central coordinates of the two fingers. More specifically, the coordinate calculating unit 255 calculates, on a straight line connecting the two focal points of the ellipse obtained by approximate processing performed by the approximate processing unit 254 and the center of the ellipse, the coordinates of two points away from the center by a second distance obtained by multiplying a first distance between each focal point and the center by a constant less than 1 as the central coordinates of the two fingers using Eq. (16). The constant that the coordinate calculating unit 255 uses is obtained from the quadratic function of elliptical eccentricity.

$$\begin{matrix} (I) \\ \text{If } a > b \\ X1 = C \times \sqrt{(a^2 - b^2)} \times (\cos\theta) + X0 \\ Y1 = C \times \sqrt{(a^2 - b^2)} \times (\sin\theta) + Y0 \\ X2 = C \times \sqrt{(a^2 - b^2)} \times (-\cos\theta) + X0 \\ Y2 = C \times \sqrt{(a^2 - b^2)} \times (-\sin\theta) + Y0 \\ (II) \\ \text{If } a \le b \\ X1 = C \times \sqrt{(b^2 - a^2)} \times (-\sin\theta) + X0 \\ Y1 = C \times \sqrt{(b^2 - a^2)} \times (\cos\theta) + Y0 \\ X2 = C \times \sqrt{(b^2 - a^2)} \times (\sin\theta) + X0 \\ Y2 = C \times \sqrt{(b^2 - a^2)} \times (-\cos\theta) + Y0 \end{matrix} \quad (16)$$

where (X1, Y1) and (X2, Y2) are the coordinates of the two focal points, a is the length of the major axis, b is the length of the minor axis, (X0, Y0) is the center of the ellipse, and C is the constant. The constant C will be described later. The value θ represents the inclination of the ellipse. The calculation is made in consideration of the magnitude relation between a and b.

The constant C used in Eq. (16) is given by a quadratic function expressed as Eq. (17) using the eccentricity e of the ellipse obtained with approximate processing performed by the approximate processing unit 254.

$$\text{Constant } C = -6.7833 \times e^2 + 10.447 \times e - 3.3596 \quad (17)$$

The three coefficients Eq. (17) vary according to the shape of the ellipse. For this reason, the three coefficients in Eq. (17) are values that can be changed according to the kind of the electrostatic coordinate input unit 110. The three coefficients in Eq. (17) are obtained through an experiment in which the interval between two fingers is set from 15 mm to 20 mm.

If the positional accuracy of the fingers may be low, the constant may be a fixed value. The constant is greater than 0 and less than 1. The constant varies according to the size and material of the electrostatic coordinate input unit 110, for example, 0.7.

Figure 11:
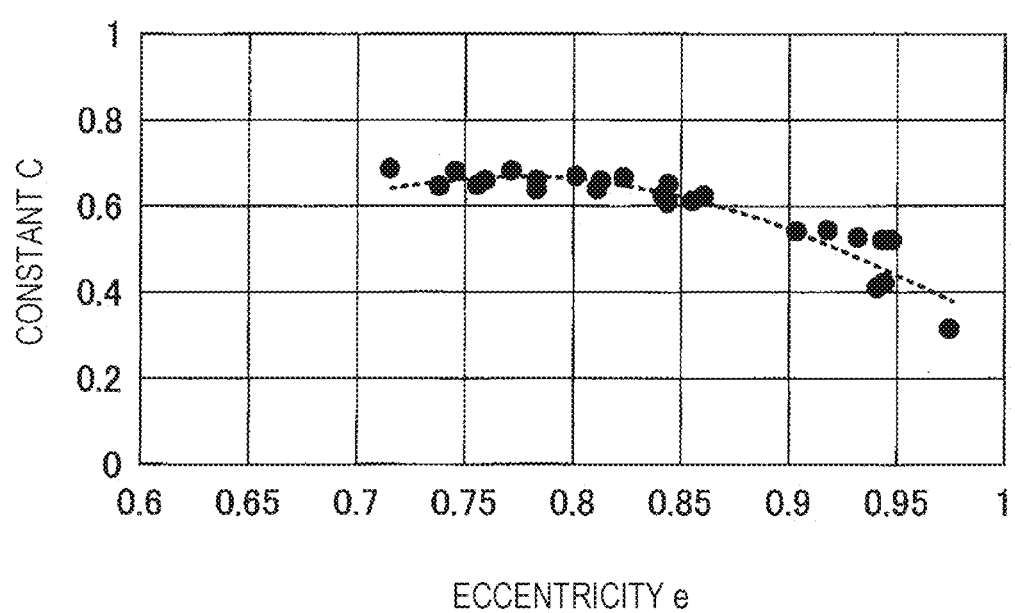
FIG. 11 is a graph showing the relationship between eccentricity e and the measured value of a constant.

FIG. 11 is a graph showing the relationship between the eccentricity e and the measured value of the constant C. A quadratic function obtained by being fitted to the relationship between the eccentricity e and the measured value of the constant C is expressed as Eq. (17). The positional relationship between the two focal points of the ellipse and the central coordinates of the two fingers will be described with reference to FIGS. 12A and 12B to FIGS. 14A and 14B.

Figure 12B:
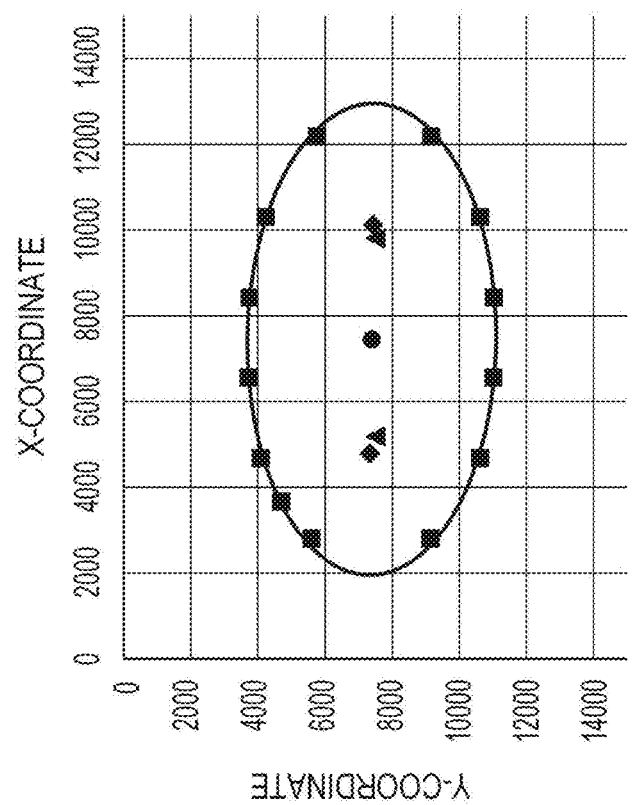
FIGS. 12A and 12B are diagrams showing an example of the ellipse obtained with approximate processing performed by an approximate processing unit and the central coordinates of two fingers calculated by a coordinate calculating unit.
Figure 12A:
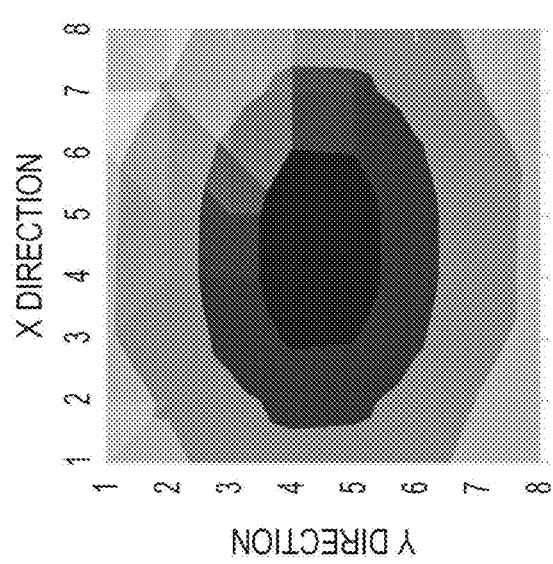
Figure 13B:
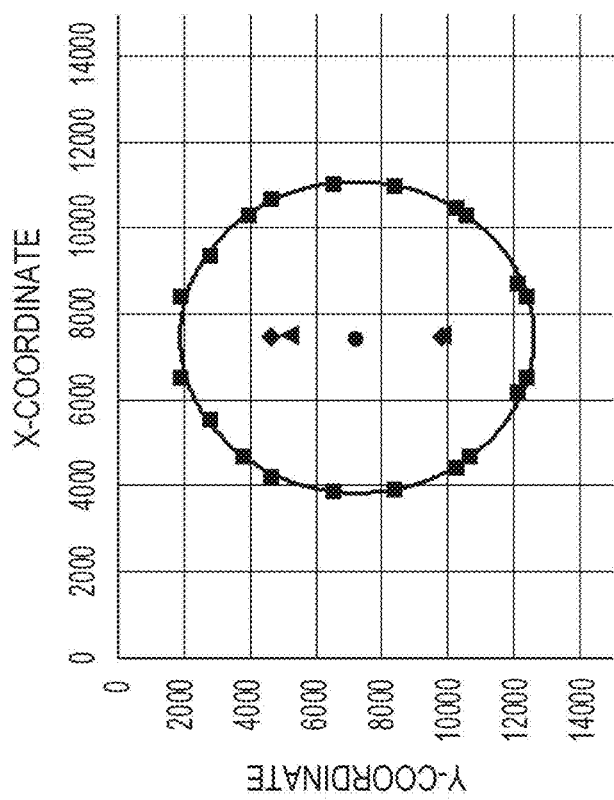
FIGS. 13A and 13B are diagrams showing an example of the ellipse obtained with approximate processing performed by the approximate processing unit and the central coordinates of two fingers calculated by the coordinate calculating unit.
Figure 13A:
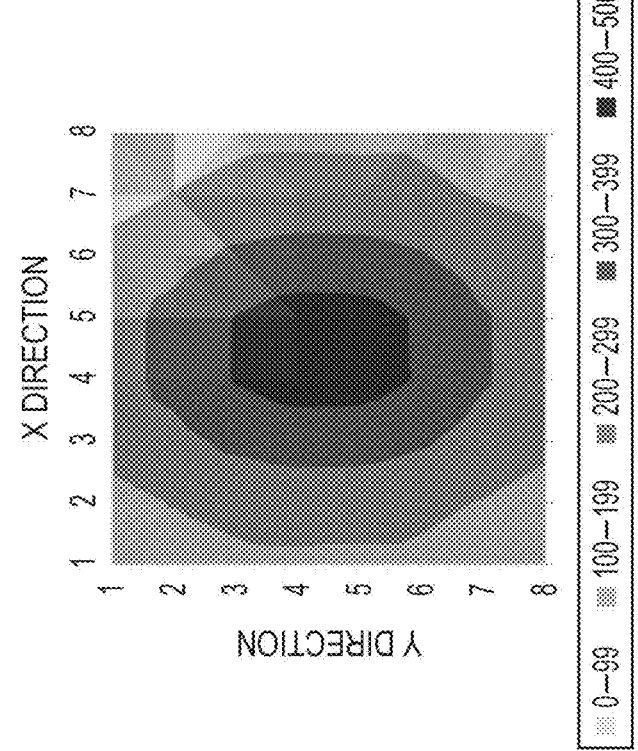
Figure 14B:
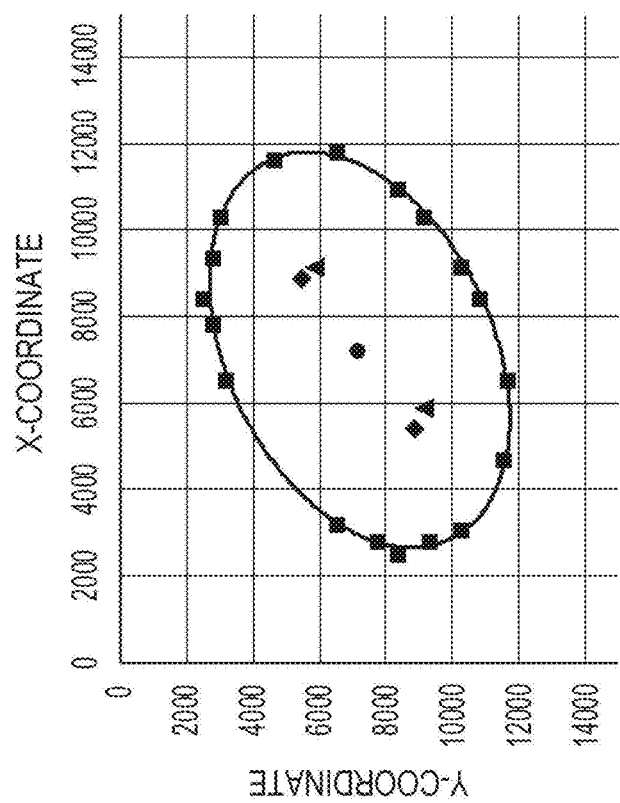
FIGS. 14A and 14B are diagrams showing an example of the ellipse obtained with approximate processing performed by the approximate processing unit and the central coordinates of two fingers calculated by the coordinate calculating unit.
Figure 14A:
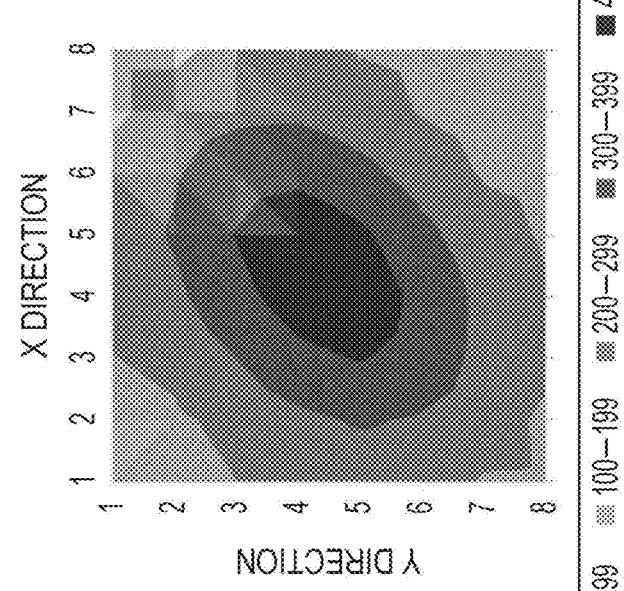

FIGS. 12A and 12B to FIGS. 14A and 14B are diagrams showing examples of the positional relationship between the ellipse obtained with approximate processing performed by the approximate processing unit 254 and the central coordinates of two fingers calculated by the coordinate calculating unit 255. FIGS. 12A and 12B show a result in the case where two fingers are placed parallel to the X-axis on the electrostatic coordinate input unit 110. FIGS. 13A and 13B show a result in the case where two fingers are placed parallel to the Y-axis on the electrostatic coordinate input unit 110. FIGS. 14A and 14B show a result in the case where two fingers are placed on the electrostatic coordinate input unit 110 at π/4 [rad] with respect to the X-axis and the Y-axis on the electrostatic coordinate input unit 110. In any case, the interval between the centers of the two fingers is 15 mm.

FIGS. 12A, 13A, and 14A show the distribution of the difference values of the capacitance calculated from the output of the converting unit 151. There are eight electrodes 111 and eight electrodes 112 and 64 intersections 113. For the interval between the intersections 113, values linearly interpolated from the values at the intersections 113 are calculated. The difference values of the capacitance are expressed as relative values (0 to 500, the maximum value: 500). FIGS. 12A, 13A, and 14A show the relative values in five levels of 0-99, 100-199, 200-299, 300-399, and 400-500.

As shown in FIGS. 12A, 13A, and 14A, distributions in the form of an ellipse that is long in the X direction, an ellipse that is long in the Y direction, and an ellipse that is long in the direction of π/4 [rad] with respect to the X-axis and the Y-axis are obtained.

FIGS. 12B, 13B, and 14B show points at which the relative values of the difference values are 300 with solid black squares (▪) and, on a straight line connecting the two focal points of an ellipse fitted to a plurality of points at which the relative values of the difference values is 300 and the center of the ellipse, two points away from the center by the second distance obtained by multiplying the first distance between each focal point and the center by the constant with solid black rhombuses (◆). The relative value of 300 is measured on the outline in the range in which the ball of the finger F is in contact with the electrostatic coordinate input unit 110. If the number of intersections 113 of the electrodes is small, the positions where the relative value is 300 when the two fingers F and F' are erected and brought into contact with the electrostatic coordinate input unit 110 form an ellipse.

The ellipse fitted to the plurality of points at which the relative values of the difference values are 300 is obtained by the approximate processing unit 254 performing approximate processing for approximating the outline in the range in which coordinates at which the difference values converted by the converting unit 151 exceed a threshold (here, 300) to an ellipse.

The two points (▫), on the straight line connecting the two focal points and the center of the ellipse obtained with approximate processing, away from the center by the second distance obtained by multiplying the first distance between each focal point and the center by the constant are the two points calculated by the coordinate calculating unit 255 using Eq. (16) as the central coordinates of the two fingers.

FIGS. 12B, 13B, and 14B show the actually measured central coordinates of the two fingers, with solid black triangles (▲). Actually, the coordinates are actually the coordinates of positions where two false fingers are placed on the electrostatic coordinate input unit 110.

As shown in FIGS. 12B, 13B, and 14B, the two points (▫) away from the center by the second distance obtained by multiplying the first distance by the constant, calculated as the central coordinates of the two fingers by the coordinate calculating unit 255 are very close to, substantially coincide with, the actually measured central coordinates (▲) of the two fingers.

The coordinate calculating unit 255 calculates the center of the two points (▫) representing the central coordinates of the two fingers as the center position of the central coordinates of the two fingers. The center position of the central coordinates of the two fingers is the position represented by the solid black dot (● M) and the center of the two points (▫) representing the central coordinates of the two fingers.

Figure 15B:
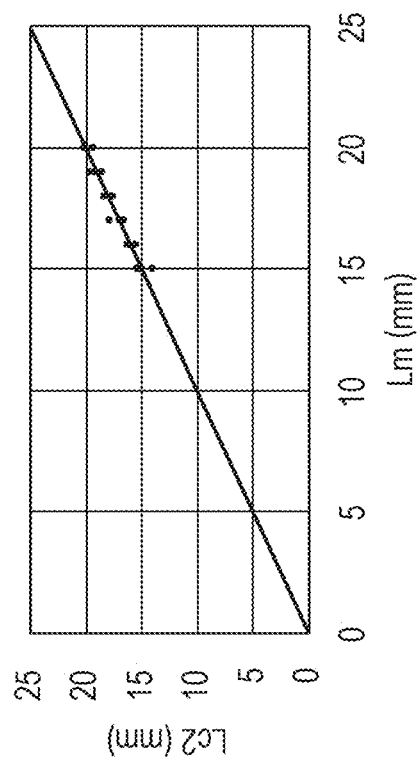
FIGS. 15A and 15B are graphs showing the relationship between the distance Lm between the measured central coordinates of the two fingers and the distances Lc1 and Lc2 between the two points calculated by the coordinate calculating unit as the central coordinates of the two fingers.
Figure 15A:
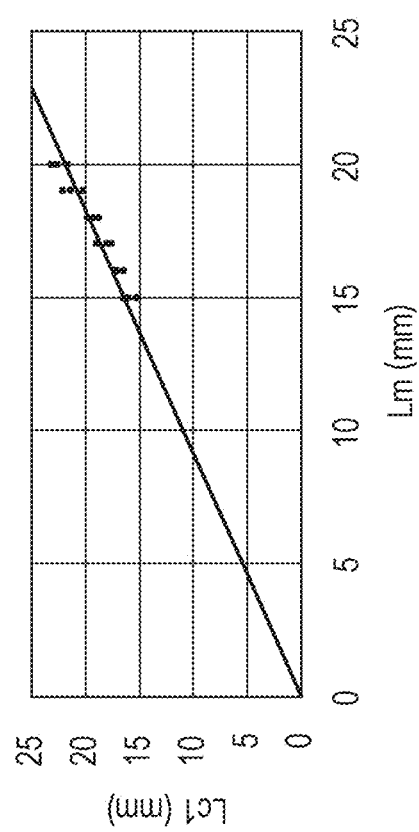
Figure 16A:
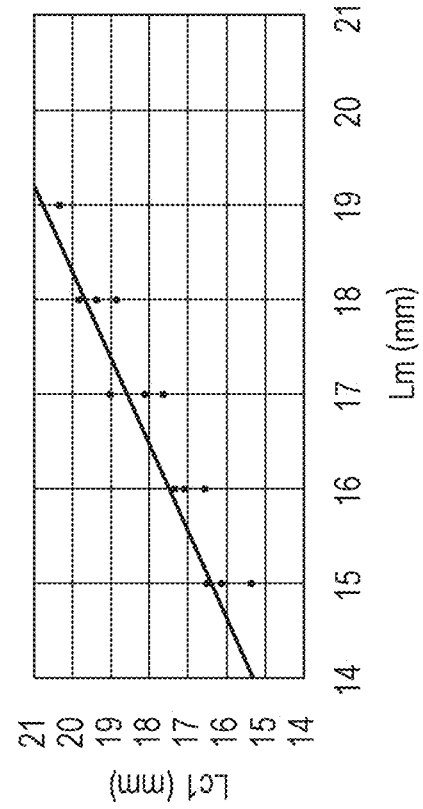
FIGS. 16A and 16B are graphs showing the relationship between the distance Lm between the measured central coordinates of the two fingers and the distances Lc1 and Lc2 between the two points calculated by the coordinate calculating unit as the central coordinates of the two fingers.
Figure 16B:
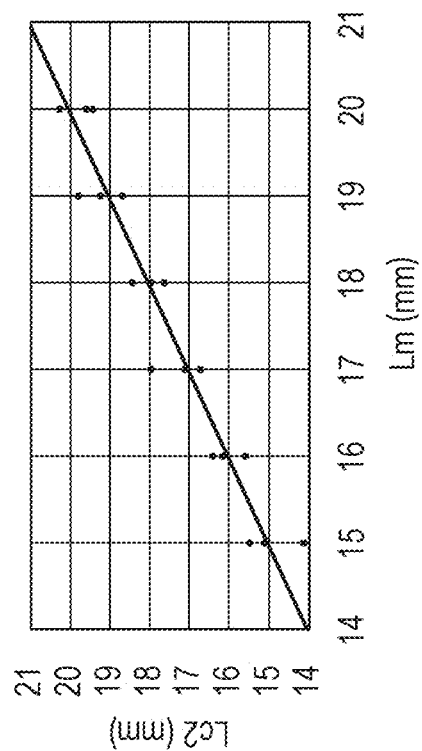

FIGS. 15A and 15B and FIGS. 16A and 16B are graphs showing the relationship between the distance Lm between the measured central coordinates of the two fingers and the distances Lc1 and Lc2 between the two points calculated by the coordinate calculating unit 255 as the central coordinates of the two fingers. FIGS. 16A and 16B show a part corresponding to the partial section of the horizontal axis and the vertical axis of FIGS. 15A and 15B in enlarged view.

FIGS. 15A and 16A show the distance Lc1 between two the points calculated by the coordinate calculating unit 255 using Eq. (16) and a constant (0.7). FIGS. 15B and 16B shows a distance Lc2 between the two points calculated by the coordinate calculating unit 255 using the constant C in Eqs. (16) and (17).

In FIGS. 15A and 15B and FIGS. 16A and 16B, the horizontal axis represents measured values, and the vertical axis represents calculated values. Thus, the higher the accuracy of calculation performed by the coordinate calculating unit 255, the closer to the solid straight line with a slope of 1. A comparison between FIGS. 15A and 16A and FIGS. 15B and 16B showed that the distance Lc2 calculated using the constant C in Eq. (17) shown in FIGS. 15B and 16B is closer to the straight line than the distance Lc1 calculated using the constant (0.7) shown in FIGS. 15A and 16A. This showed that using the constant C in Eq. (17) provided higher calculation accuracy to the coordinate calculating unit 255 than using the constant (0.7).

Figure 17:
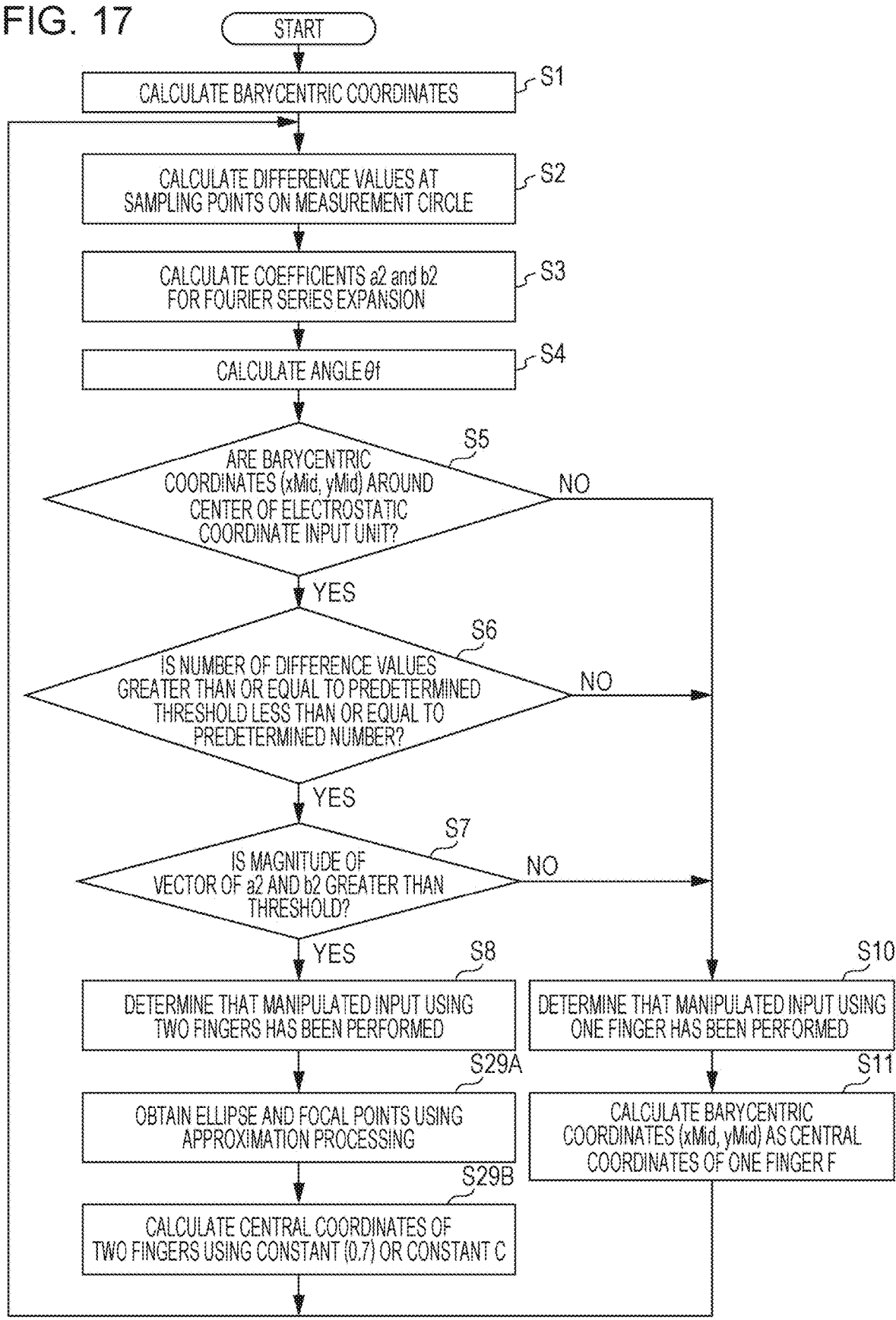
FIG. 17 is a flowchart for the processing of an input determination method according to the second embodiment.

FIG. 17 is a flowchart for the processing of the input determination method according to the second embodiment. The flowchart shown in FIG. 17 includes steps S29A and S29B in place of step S9 in the first embodiment shown in FIG. 8. The difference will be described hereinbelow.

If at step S8 the operation determining unit 154 determines that a manipulated input has been performed using two fingers, then the approximate processing unit 254 finds an ellipse and the coordinates of the focal points of the ellipse by performing approximate processing (step S29A). If at step S29B the constant C in Eq. (17) is to be used, the approximate processing unit 254 finds the eccentricity e in addition to the ellipse and the coordinates of the focal points of the ellipse at step S29A. To find an ellipse is to find an equation representing the ellipse in the X-Y coordinates of the electrostatic coordinate input unit 110. The coordinates of the focal points and the eccentricity e may be found in accordance with the equation representing the ellipse.

Next, the coordinate calculating unit 255 calculates using Eq. (16), on a straight line connecting the two focal points of the ellipse obtained with approximate processing performed by the approximate processing unit 254 and the center of the ellipse, the coordinates of two points away from the center by the second distance obtained by multiplying the first distance between each focal point and the center by the constant (0.7) or the constant C in Eq. (17) as the central coordinates of the two fingers (step S29B). Thus, the series of processes ends.

Thus, determination of whether periodicity of two cycles can be obtained in one round along the measurement circle allows determining whether the manipulated input has been performed using two fingers or one finger. An ellipse representing the distribution of the difference values of capacitance due to the contact of two fingers with the electrostatic coordinate input unit 110 can be obtained with approximate processing, and the central coordinates of the two fingers can be calculated using the constant in Eq. (16). The constant used in Eq. (16) is the constant in Eq. (16) or the constant (0.7).

Accordingly, this allows providing the electrostatic input apparatus 200 capable of distinguishing between a state in which one finger extended diagonally is in contact with the electrostatic coordinate input unit and a state in which two or more fingers are in contact with the electrostatic coordinate input unit, and an input determination method for the same. This also provides the electrostatic input apparatus 200 capable of calculating the central coordinates of two fingers with high accuracy and an input determination method for the same.

Third Embodiment

Figure 18:
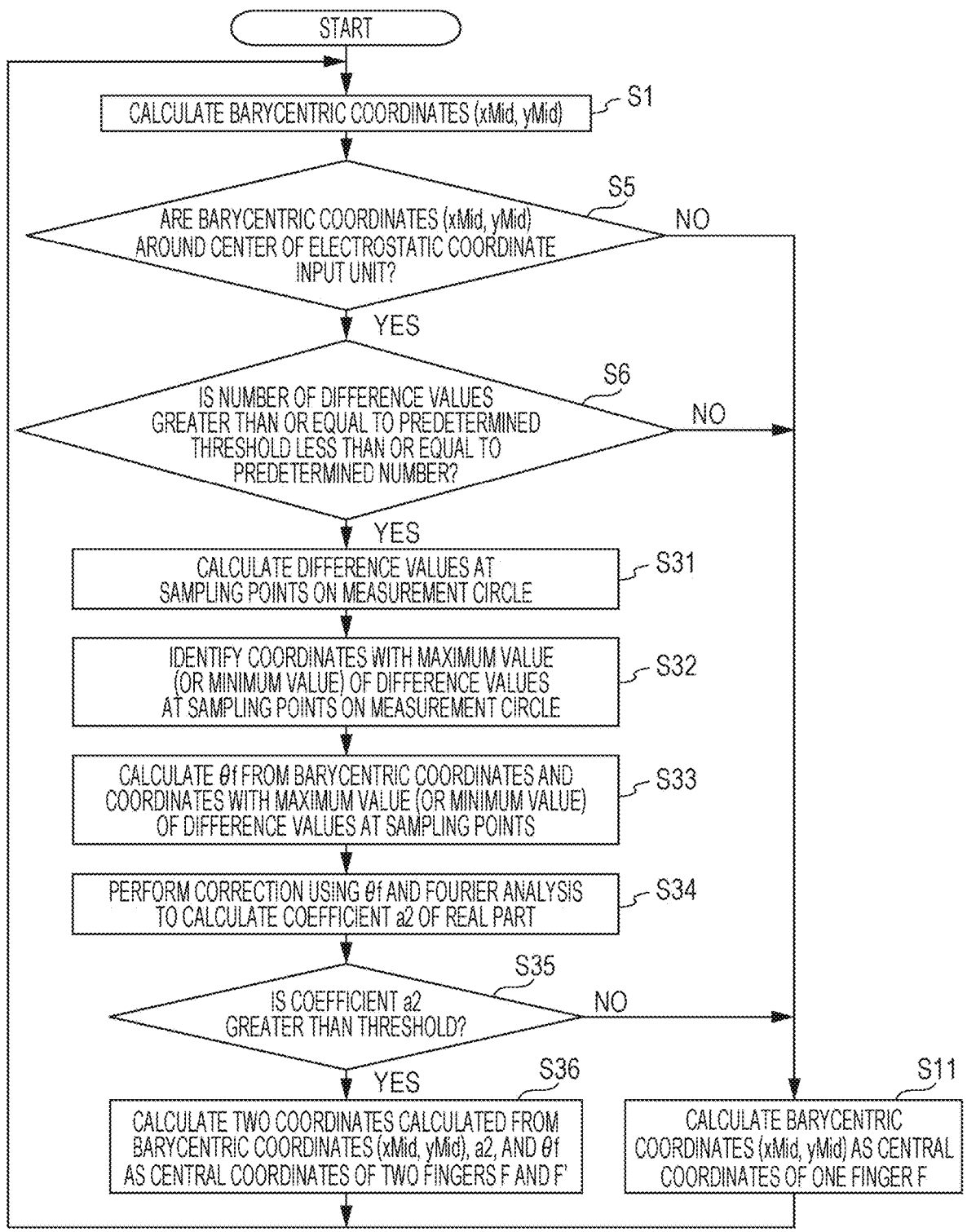
FIG. 18 is a flowchart for the processing of an input determination method according to a third embodiment.

FIG. 18 is a flowchart for the processing of an input determination method according to a third embodiment. The flowchart shown in FIG. 18 is based on the flowchart of the first embodiment shown in FIG. 8 and can be executed by the electrostatic input apparatus 100 of the first embodiment. Here, an input determination method of a first modification of the input determination method of the first embodiment will be described as the input determination method of the third embodiment. In FIG. 18, the same processes as those of the steps shown in FIG. 8 are denoted by the same reference numbers.

In the third embodiment, the operation determining unit 154 calculates a Fourier-analyzed real part from the difference values at the coordinates on the circumference of a circle with a predetermined radius centered on the barycentric coordinates (xMid, yMid) with reference to the coordinates of the maximum value or the minimum value of the difference values of capacitance at the intersection 113 according to the distance between the electrostatic coordinate input unit 110 and the finger, converted by the converting unit 151, and if the magnitude of the Fourier-analyzed real part of two cycles in one round along the circle is greater than a threshold (a predetermined threshold), the operation determining unit 154 determines that an input operation using two or more fingers has been performed.

The Fourier analysis includes Fourier series expansion, complex Fourier series expansion, and Fourier transformation, any of which may be used. Fourier-analyzed real part includes a real part of complex Fourier series, a Fourier-transformed real part, and the cosine of Fourier series.

When the processing is started, the barycentric-coordinate calculating unit 152 calculates coordinates at which a manipulated input is performed from the output of the converting unit 151 (step S1). The coordinates calculated at step S1 are the barycentric coordinates (xMid, yMid) of a finger area FA where the output of the converting unit 151 is higher than or equal to a predetermined threshold.

The operation determining unit 154 determines whether the barycentric coordinates (xMid, yMid) calculated at step S1 is within a predetermined range of the central portion of the electrostatic coordinate input unit 110 (step S5). This is because, if the barycentric coordinates (xMid, yMid) is not within the predetermined range of the central portion of the electrostatic coordinate input unit 110, the measurement circle is out of the measurable range of the electrostatic coordinate input unit 110, and as a result, the difference values at the sampling points of the measurement circle cannot be obtained.

If the operation determining unit 154 determines that the barycentric coordinates (xMid, yMid) is within the predetermined range of the central portion of the electrostatic coordinate input unit 110 (S5: YES), then the operation determining unit 154 determines whether the number of difference values greater than or equal to a predetermined threshold (a threshold for difference values) of the difference values detected for the entire electrostatic coordinate input unit 110 is less than or equal to a predetermined number (step S6). If the number of difference values greater than or equal to the predetermined threshold is greater than the predetermined number, two fingers are not used for operation. For example, three or more fingers or the palm of a hand may be used.

If the operation determining unit 154 determines that the number of difference values greater than or equal to the predetermined threshold (the threshold for difference values) is less than or equal to the predetermined number (S6: YES), then the cycle determining unit 153 calculates difference values at sampling points at intervals of $\pi/18$ [rad] from the point of 0 [rad] on the measurement circle (step S31). The sampling points are 9 mm away from the barycentric coordinates. The sampling points are at positions rotated at intervals of $\pi/18$ [rad] from 0 [rad] in the X-axis direction from the center of gravity. The coordinates of each sampling point are expressed as Eq. (18).

$$\begin{cases} x = 9\cos\theta_n + xMid \\ y = 9\sin\theta_n + yMid \end{cases} \quad (18)$$

where $$\theta_n = \left\{\frac{n\pi}{18}\right\}_{n=0}^{17}$$

The process of step S31 is the same as the process of step S2 of the first embodiment. If the intersection 113 of the electrode 111 and the electrode 112 is present at the sampling point, the difference value at the sampling point is a difference value at the intersection 113. If no intersection 113 is present at the sampling point, the cycle determining unit 153 uses a value linearly approximated from the difference values at multiple intersections 113 around the sampling point.

The operation determining unit 154 identifies the coordinates of a maximum value of the difference values at the sampling points on the circumference of the measurement circle (step S32).

The operation determining unit 154 calculates θf from the barycentric coordinates and the coordinates (xMax, yMax) of the maximum value of the difference values at the sampling points (step S33). The value θf is calculated using Eq. (19).

$$\theta f = \begin{cases} \arctan\dfrac{y\text{Max} - y\text{Mid}}{x\text{Max} - x\text{Mid}} & \text{if } x > 0, \\ \arctan\dfrac{y\text{Max} - y\text{Mid}}{x\text{Max} - x\text{Mid}} + \pi & \text{if } x < 0 \text{ and } y \geq 0, \\ \arctan\dfrac{y\text{Max} - y\text{Mid}}{x\text{Max} - x\text{Mid}} - \pi & \text{if } x < 0 \text{ and } y < 0, \\ \dfrac{\pi}{2} & \text{if } x\text{Max} - x\text{Mid} = 0 \text{ and } y\text{Max} - y\text{Mid} > 0, \\ \dfrac{\pi}{2} & \text{if } x\text{Max} - x\text{Mid} = 0 \text{ and } y\text{Max} - y\text{Mid} < 0 \end{cases} \quad (19)$$

Figure 22:
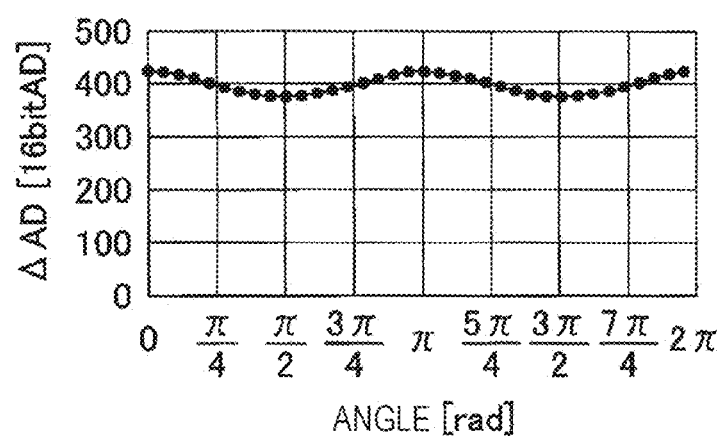
FIG. 22 is a diagram showing corrected measured values.

The operation determining unit 154 performs correction with θf identified at step S33 and performs Fourier analysis to calculate the coefficient a2 of real part of the second term of Fourier series. For example, if the values on the circumference of the measurement circle are the values shown in FIG. 6C, the angles in the range from 0 to $\pi/4$ [rad] are corrected to angles plus $7\pi/4$ [rad], and the angles in the range from $\pi/4$ to $2\pi$ [rad] are corrected to values minus $\pi/4$ [rad]. As a result, the values are corrected to values shown in FIG. 22. The coefficient a2 of the Fourier-analyzed real part is calculated from the difference values at the sampling points at the coordinates on the circumference of a circle with a predetermined radius centered on the barycentric coordinates (xMid, yMid) (step S34). The value 0 [rad] is the maximum value. Accordingly, if the data has periodicity of two cycles in a round ($2\pi$), the coefficient b2 of an imaginary part of the second term of Fourier series is substantially zero. Accordingly, by performing correction so that the angle of the coordinates of the maximum value of the difference values of the capacitance comes to 0 [rad] and then performing Fourier analysis, the periodicity can be determined using only the coefficient a2 of the real part. Performing correction so that the angle of the coordinates of the minimum value comes to zero also allows the coefficient a2 of the Fourier-analyzed real part to have substantially the same value.

The operation determining unit 154 determines whether the coefficient a2 of the Fourier-analyzed real part of two cycles in one round along the circle is greater than the threshold (the predetermined threshold) (step S35).

If the operation determining unit 154 determines that the coefficient a2 of the real part is greater than the threshold (the predetermined threshold), the process goes to step S36 for calculating the coordinates of the two fingers.

The coordinate calculating unit 155 calculates two coordinates determined from the barycentric coordinates (xMid, yMid), the coefficient a2 of the real part, and the angle θf as the central coordinates of the two fingers F and F' (step S36). The coordinates of the minimum value may be used instead of the coordinates of the maximum value. With the barycentric coordinates (xMid, yMid) and the coordinates of the minimum value of the difference values of the capacitance, the two fingers are positioned at an angle θf+π/2 and an angle θf−π/2 (an angle different from θf by π/2). For this reason, one of the maximum value and the minimum value of the difference values may be used for calculation.

If at step S5 the operation determining unit 154 determines that the barycentric coordinates (xMid, yMid) are not within the predetermined range of the central portion of the electrostatic coordinate input unit 110 (S5: NO), it is determined that the manipulated input has been performed using one finger, and the coordinate calculating unit 155 calculates the barycentric coordinates (xMid, yMid) calculated at step S1 as the central coordinates of the one finger F (step S11). If it is determined at step S6 that the number of difference values greater than or equal to the predetermined threshold is greater than the predetermined number (S6: NO), it is determined that the manipulated input has not been performed using two fingers, and the coordinate calculating unit 155 calculates the barycentric coordinates (xMid, yMid) calculated at step S1 as the central coordinates of one finger F (step S11). If it is determined at step S35 that the magnitude of the coefficient a2 is not greater than the threshold (step S35: NO), it is determined that the manipulated input has been performed using one finger, and the coordinate calculating unit 155 calculates the barycentric coordinates (xMid, yMid) calculated at step S1 as the central coordinates of one finger F (step S11). Thus, the series of processes ends.

Thus, the Fourier analyzed-real part is calculated from the difference values at the coordinates on the circumference of a circle with a predetermined radius centered on the barycentric coordinates (xMid, yMid) with reference to the maximum value or the minimum value of the difference values of the capacitance, and if the magnitude of the Fourier-analyzed real part of two cycles in one cycle along the circle is greater than the threshold (the predetermined threshold), it can be determined that an input operation using two or more fingers has been performed.

Accordingly, this allows providing an electrostatic input apparatus capable of distinguishing between a state in which one finger extended diagonally is in contact with the electrostatic coordinate input unit and a state in which two or more fingers are in contact with the electrostatic coordinate input unit, and an input determination method for the same. This also provides an electrostatic input apparatus capable of calculating the central coordinates of two fingers with high accuracy and an input determination method for the same.

Fourth Embodiment

Figure 19:
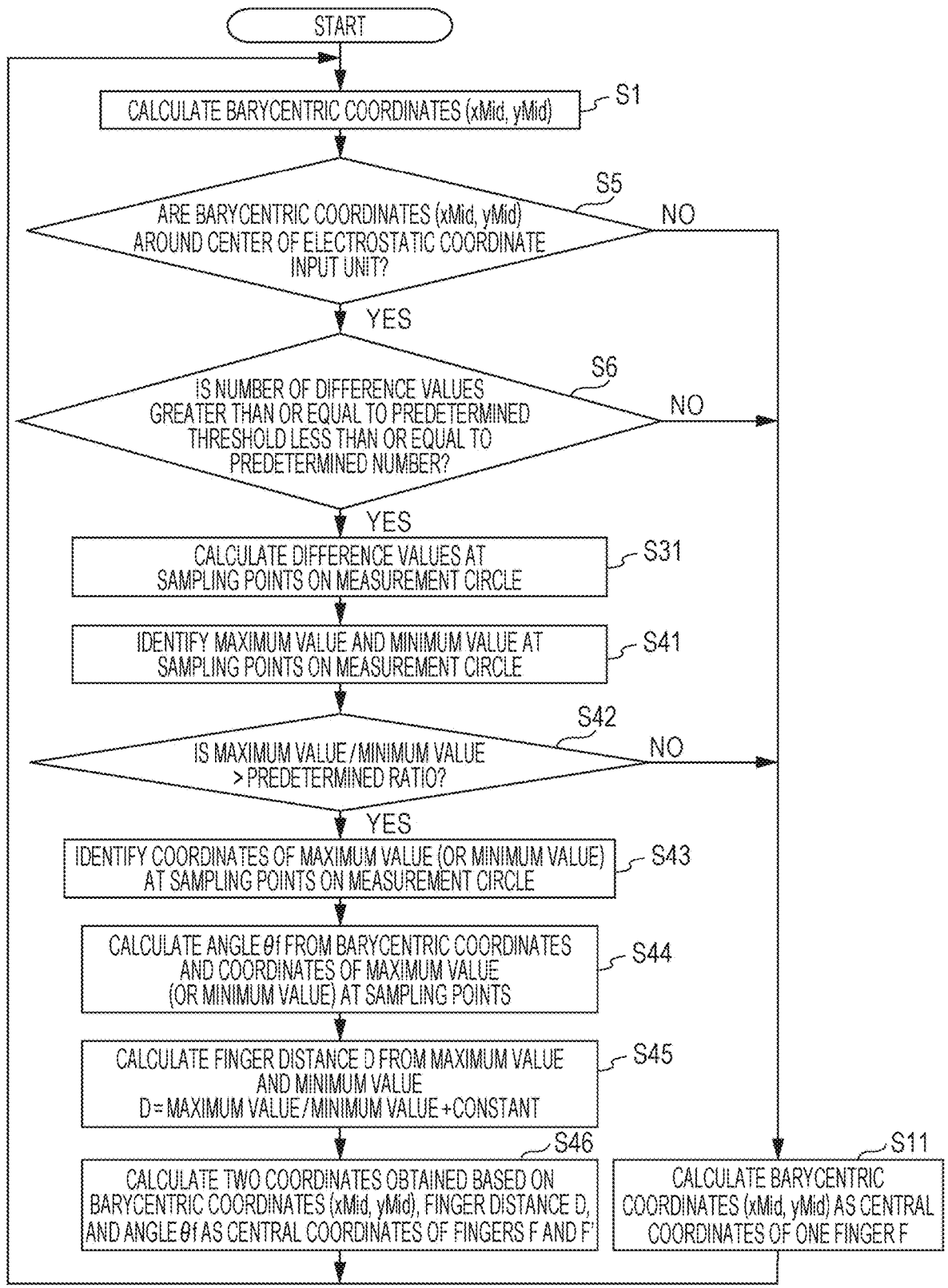
FIG. 19 is a flowchart for the processing of an input determination method according to a fourth embodiment.

FIG. 19 is a flowchart for the processing of an input determination method according to a fourth embodiment. The flowchart shown in FIG. 19 is based on the flowchart of the first embodiment shown in FIG. 8 and can be executed by the electrostatic input apparatus 100 of the first embodiment. Here, an input determination method of a second modification of the input determination method of the first embodiment will be described as the input determination method of the fourth embodiment. In FIG. 19, the same processes as those of the steps shown in FIGS. 8 and 18 are denoted by the same reference numbers.

In the fourth embodiment, the operation determining unit 154 calculates the ratio of the maximum value to the minimum value of the difference values at the coordinates on the circumference of a circle with a predetermined radius centered on the barycentric coordinates (xMid, yMid), and if the ratio is higher than a second predetermined ratio, the operation determining unit 154 determines that an input operation using two or more fingers has been performed.

Steps S1, S5, S6, S31, and S11 shown in FIG. 19 are the same as steps S1, S5, S6, S31, and S11 shown in FIG. 18.

The operation determining unit 154 identifies the maximum value and the minimum value of the difference values at the coordinates on the circumference of a circle with a predetermined radius centered on the barycentric coordinates (xMid, yMid) (step S41).

The operation determining unit 154 determines whether the ratio of the identified maximum value to the minimum value (maximum value/minimum value) of the difference values is higher than a predetermined ratio (a second predetermined ratio) (step S42).

If the ratio of the maximum value to the minimum value (maximum value/minimum value) of the difference values is higher than the second predetermined ratio, then the operation determining unit 154 identifies the coordinates of the maximum value (or the minimum value) of the difference values at the sampling points of the measurement circle (step S43). The process of step S43 is the same as the process of step S32 in FIG. 18.

The cycle determining unit 153 calculates the angle θf from the barycentric coordinates (xMid, yMid) and the coordinates of the maximum value of the difference values at the sampling points (step S44). The process of step S44 is the same as the process of step S33 in FIG. 18. From the barycentric coordinates (xMid, yMid) and the coordinates of the maximum value of the difference values of the capacitance, the angle θf is determined. Instead of the coordinates of the maximum value, the coordinates of the minimum value may be used. From the barycentric coordinates (xMid, yMid) and the coordinates of the minimum value of the difference values of the capacitance, two fingers are positioned at the angles represented by θf+π/2 and θf−π2 (angles different from θf by π/2). For this reason, one of the maximum value and the minimum value of the difference values may be used for calculation.

The operation determining unit 154 calculates a finger distance D from the maximum value and the minimum value of the difference values at the sampling points (step S45). The finger distance D is obtained by adding a predetermined constant to the ratio of the maximum value to the minimum value (maximum value/minimum value) of the difference values. The finger distance D increases as the ratio of the major axis to the minor axis of the ellipse increases, and the finger distance D decreases as the ratio decreases.

The coordinate calculating unit 155 calculates two coordinates determined from the barycentric coordinates (xMid, yMid), the finger distance D, and the angle θf as the central coordinates of the fingers F and F' (step S46).

A case where at step S5 the operation determining unit 154 determines that the barycentric coordinates (xMid, yMid) are not within a predetermined range of the central portion of the electrostatic coordinate input unit 110 (S5: NO) indicates that the manipulated input has been performed using one finger. For this reason, the coordinate calculating unit 155 calculates the barycentric coordinates (xMid, yMid) calculated at step S1 as the central coordinates of the one finger F (step S11). Thus, the series of processes ends.

Thus, the ratio of the maximum value to the minimum value of the difference values at the coordinates on the circumference of a circle of a predetermined radius centered on the barycentric coordinates (xMid, yMid) is calculated, and if the ratio is higher than the second predetermined ratio, it can be determined that an input operation using two or more fingers has been performed.

Accordingly, this allows providing an electrostatic input apparatus capable of distinguishing between a state in which one finger extended diagonally is in contact with the electrostatic coordinate input unit and a state in which two or more fingers are in contact with the electrostatic coordinate input unit, and an input determination method for the same. This also provides an electrostatic input apparatus capable of calculating the central coordinates of two fingers with high accuracy and an input determination method for the same.

Fifth Embodiment

Figure 20:
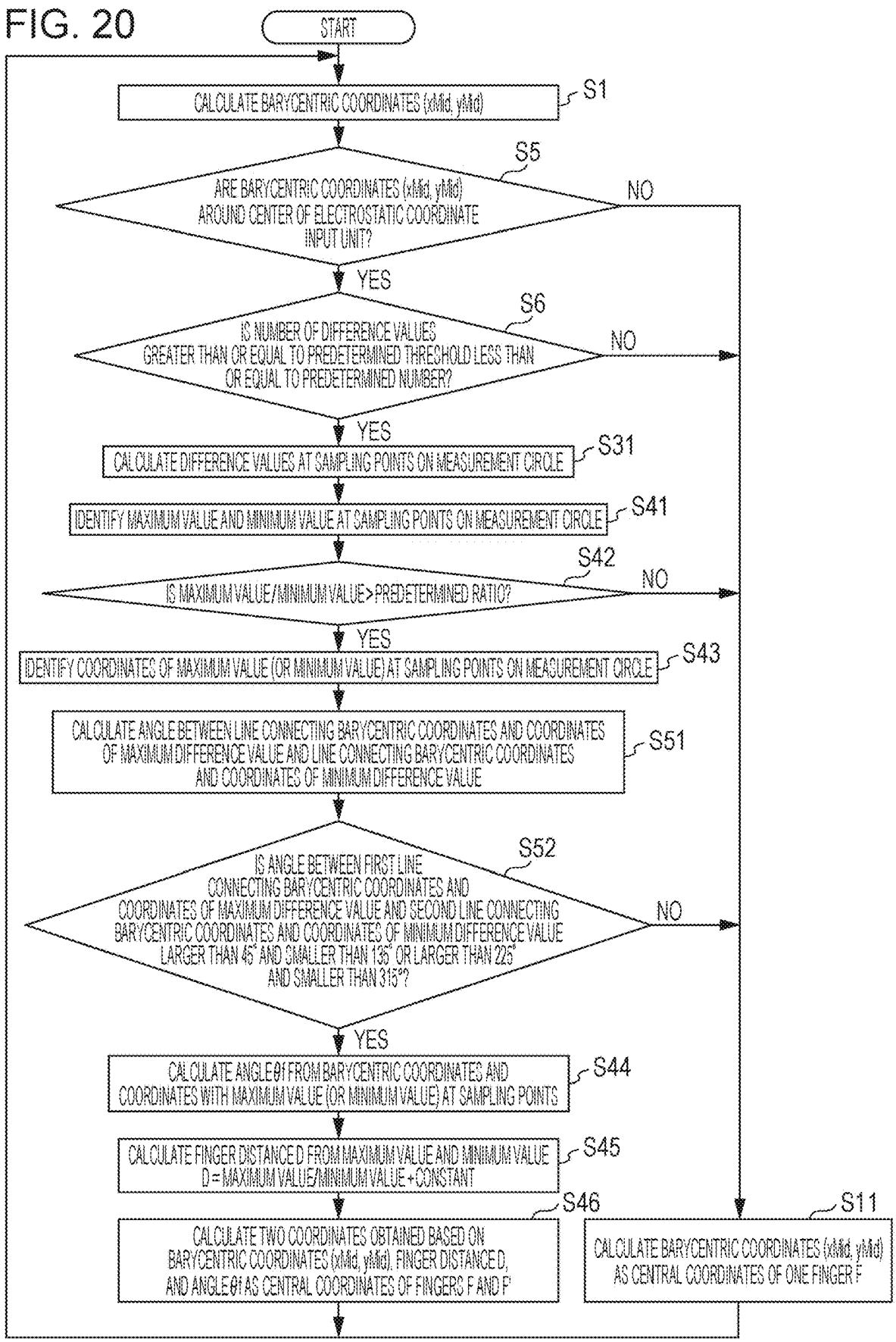
FIG. 20 is a flowchart for the processing of an input determination method according to a fifth embodiment.
Figure 21B:
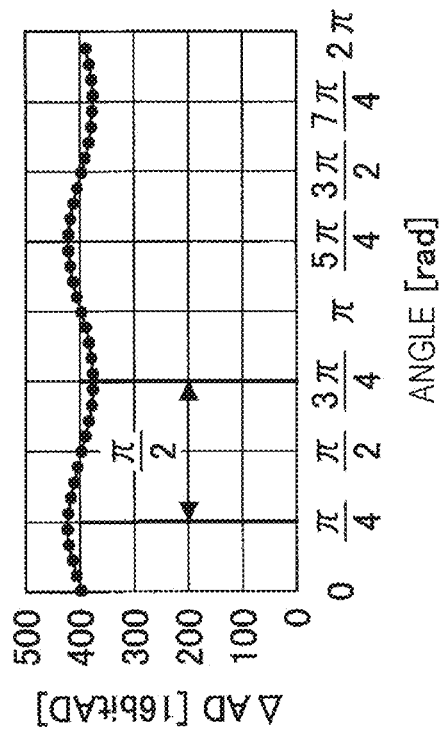
FIGS. 21A and 21B are diagrams illustrating the planar distribution of the difference values and the difference in the angular characteristics of the difference values according to the difference in the positional relationship between the two fingers.
Figure 21A:
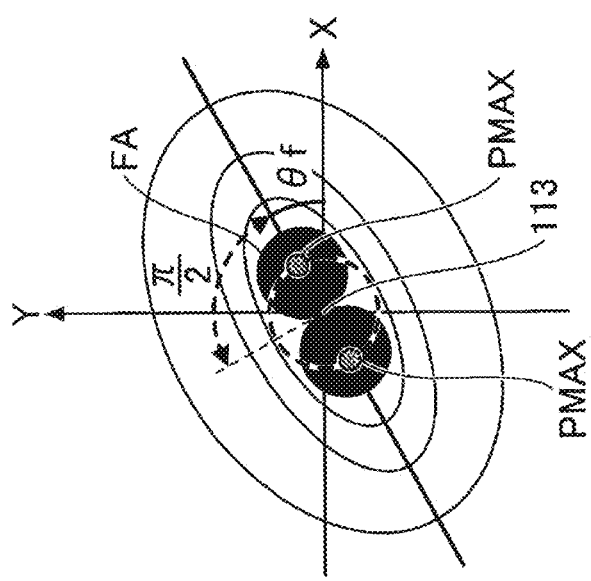

FIG. 20 is a flowchart for the processing of an input determination method according to a fifth embodiment. FIGS. 21A and 21B are diagrams illustrating the planar distribution of the difference values and the difference in the angular characteristics of the difference values according to the difference in the positional relationship between the two fingers F and F'. The flowchart shown in FIG. 20 is based on the flowchart of the first embodiment shown in FIG. 8, and the electrostatic input apparatus 100 of the first embodiment can be executed. Here, an input determination method of a third modification of the input determination method of the first embodiment will be described as the input determination method of the fifth embodiment. In FIG. 20, the same processes as those of the steps shown in FIGS. 8, 18, and 19 are denoted by the same numbers.

In the fifth embodiment, the operation determining unit 154 calculates the ratio of the maximum value to the minimum value of the difference values at coordinates on the circumference of a circle with a predetermined radius centered on the barycentric coordinates (xMid, yMid), and if the ratio is higher than a third predetermined ratio, and the angle between a first line segment connecting the barycentric coordinates and the coordinates of the maximum value of the difference values and a second line segment connecting the barycentric coordinates and the coordinates of the minimum value of the difference values is larger than $\pi/4$ [rad] and smaller than $3\pi/4$ [rad] or larger than $5\pi/4$ [rad] and smaller than $7\pi/4$ [rad], the operation determining unit 154 determines that an input operation using two or more fingers has been performed.

The steps S1, S5, S6, S31, S41, S42, S43, S44, S45, S46, and S11 of the processing shown in FIG. 20 are the same as those of the steps S1, S5, S6, S31, S41, S42, S43, S44, S45, S46, and S11 shown in FIG. 19.

At step S42, the operation determining unit 154 determines whether the ratio of the identified maximum value to the identified minimum value (maximum value/minimum value) of the difference values is higher than a predetermined ratio (a third predetermined ratio) (step S42). The predetermined ratio (the third predetermined ratio) used at step S42 in FIG. 20 differs in value from the predetermined ratio (the second predetermined ratio) used in step S42 of FIG. 19. In the process shown in FIG. 19, if the ratio of the maximum value to the minimum value (maximum value/minimum value) of the difference values is higher than the predetermined ratio (the second predetermined ratio), it is determined that an input operation using two or more fingers has been performed. This requires to distinguish between one oblique finger F, as shown in FIG. 3A and two fingers F and F'. For this reason, the predetermined ratio (the second predetermined ratio) is set at a relatively great value, which is greater than the predetermined ratio (the third predetermined ratio) at step S42 in FIG. 20. In contrast, the processing shown in FIG. 20 includes the process of step S52 described below in addition to the determination process of step S42, and therefore, the predetermined ratio (the third predetermined ratio) may be lower than the predetermined ratio (the second predetermined ratio) at the step S42 of FIG. 19.

After at step S43 the operation determining unit 154 identifies the coordinates of the maximum value (or the minimum value) of the difference values at the sampling points on the measurement circle, the operation determining unit 154 calculates the angle between a line connecting the barycentric coordinates and the coordinates of the maximum value of the difference values and a line connecting the barycentric coordinates and the coordinates of the minimum value of the difference value (step S51). If the sampling point showing the maximum value is in the direction of $\pi/4$ [rad] and the sampling point showing the minimum value is in the direction of $3\pi/4$ [rad], as shown in FIG. 21A, the difference therebetween is $\pi/2$ [rad], as shown in FIGS. 21A and 21B. For this reason, it can be determined that two fingers are present.

The operation determining unit 154 determines whether the angle between the first line segment connecting the barycentric coordinates and the coordinates of the maximum value of the difference values and the second line segment connecting the barycentric coordinates and the coordinates of the minimum value of the difference values is larger than $\pi/4$ [rad] and smaller than $3\pi/4$ [rad] or larger than $5\pi/4$ [rad] and smaller than $7\pi/4$ [rad] (step S52).

If at step S52 the operation determining unit 154 determines YES, the processing goes to step S44. Thereafter, the processes of step S45 and S46 are performed as in the processing shown in FIG. 19.

Thus, the ratio of the maximum value to the minimum value of the difference values at coordinates on the circumference of a circle with a predetermined radius centered on the barycentric coordinates (xMid, yMid) is calculated, and if the ratio is higher than the third predetermined ratio, and the angle between the first line segment connecting the barycentric coordinates and the coordinates of the maximum value of the difference values and the second line segment connecting the barycentric coordinates and the coordinates of the minimum value of the difference values is larger than $\pi/4$ [rad] and smaller than $3\pi/4$ [rad] or larger than $5\pi/4$ [rad] and smaller than $7\pi/4$ [rad], it can be determined that an input operation using two or more fingers has been performed.

Accordingly, this allows providing an electrostatic input apparatus capable of distinguishing between a state in which one finger extended diagonally is in contact with the electrostatic coordinate input unit and a state in which two or more fingers are in contact with the electrostatic coordinate input unit, and an input determination method for the same. This also provides an electrostatic input apparatus capable of calculating the central coordinates of two fingers with high accuracy and an input determination method for the same.

Having described electrostatic input apparatuses and input determination methods of exemplary embodiments of the present invention, it is to be understood that the present invention is not limited the specifically disclosed embodiments and various modifications and changes can be made without departing from the scope of the claims.

What is claimed is:

1. An electrostatic input apparatus comprising:
   a measuring unit that measures capacitance at a plurality of coordinates of an electrostatic coordinate input unit;
   a converting unit that obtains a reference value of the capacitance and subtracts the reference value from the capacitance to convert the capacitance to difference values according to a distance between the electrostatic coordinate input unit at the plurality of coordinates and a finger;
   a first coordinate calculating unit that calculates barycentric coordinates of a contact portion from the difference values for the plurality of coordinates;
   a cycle determining unit that determines whether the difference values at coordinates on a circumference of a circle with a predetermined radius centered on the barycentric coordinates exhibit periodicity of two cycles in one round along the circle; and
   an operation determining unit that performs, when the cycle determining unit determines that the difference values exhibit periodicity of two cycles, a determination that an input operation using two or more fingers has been performed.

2. The electrostatic input apparatus according to claim 1, wherein the operation determining unit performs Fourier analysis of the difference values on the coordinates on the circumference of the circle, wherein, if magnitude of a vector in which the difference values exhibit two cycles in one round along the circle is larger than a predetermined threshold for the magnitude of the vector, the operation determining unit determines that the input operation using two or more fingers has been performed.

3. The electrostatic input apparatus according to claim 1, wherein the operation determining unit performs Fourier analyze of measured values of electrodes on the circumference of the circle, wherein, if a ratio of the magnitude of the vector in which the difference values exhibit two cycles in one round along the circle to a direct-current component is higher than a first predetermined ratio, the operation determining unit determines that the input operation using two or more fingers has been performed.

4. The electrostatic input apparatus according to claim 2, wherein a distance between the fingers is calculated as twice the magnitude of the vector.

5. The electrostatic input apparatus according to claim 2, wherein a direction of the vector with respect to a predetermined reference direction is calculated as a direction connecting two fingers.

6. The electrostatic input apparatus according to claim 1, wherein the operation determining unit calculates a Fourier-analyzed real part from the difference values at the coordinates on the circumference of the circle with reference to coordinates of a maximum value or a minimum value of the difference values, wherein, if magnitude of the Fourier-analyzed real part in which the difference values exhibit two cycles in one round along the circle is greater than another predetermined threshold, the operation determining unit determines that the input operation using two or more fingers has been performed.

7. The electrostatic input apparatus according to claim 1, wherein the operation determining unit calculates a ratio of a maximum value to a minimum value of the difference values at the coordinates on the circumference of the circle, wherein if the ratio is higher than a second predetermined ratio, the operation determining unit determines that the input operation using two or more fingers has been performed.

8. The electrostatic input apparatus according to claim 1, wherein the operation determining unit calculates a ratio of a maximum value to a minimum value of the difference values at the coordinates on the circumference of the circle, wherein, if the ratio is higher than a third predetermined ratio and an angle between a first line segment connecting the barycentric coordinates and coordinates of the maximum value and a second line segment connecting the barycentric coordinates and coordinates of the minimum value is larger than $\pi/4$[rad] and smaller than $3\pi/4$[rad] or larger than $5\pi/4$[rad] and smaller than $7\pi/4$[rad], the operation determining unit determines that the input operation using two or more fingers has been performed.

9. The electrostatic input apparatus according to claim 1, further comprising:
   an approximate processing unit that approximates, if the cycle determining unit determines the coordinate values exhibit the periodicity of two cycles, an outline of a range in which coordinates at which the difference values exceed a threshold are present to an ellipse; and
   a second coordinate calculating unit that calculates a position closer to a center of the ellipse than two focal points of the ellipse as central coordinates of two fingers.

10. The electrostatic input apparatus according to claim 9, wherein the second coordinate calculating unit calculates, on a straight line connecting the two focal points of the ellipse and the center of the ellipse, coordinates of two points away from the center by a second distance obtained by multiplying a first distance between each focal point and the center by a constant less than 1 as the central coordinates of the two fingers.

11. The electrostatic input apparatus according to claim 10, wherein the constant is obtained from a quadratic function of eccentricity of the ellipse.

12. The electrostatic input apparatus according to claim 1, wherein the converting unit corrects the difference values by multiplying the difference values by a correction value that corrects the capacitance at the plurality of coordinates of the electrostatic coordinate input unit.

13. An input determination method executed by a computer, the method comprising:
   obtaining a reference value of capacitance at a plurality of coordinates of an electrostatic coordinate input unit and subtracting the reference value from the capacitance to convert the capacitance to difference values according to a distance between the electrostatic coordinate input unit at the plurality of coordinates and a finger;
   calculating barycentric coordinates of a contact portion from the difference values for the plurality of coordinates;
   determining whether the difference values at coordinates on a circumference of a circle with a predetermined radius centered on the barycentric coordinates exhibit periodicity of two cycles in one round along the circle; and when it is determined that the difference values exhibit periodicity of two cycles, determining that an input operation using two or more fingers has been performed.

* * * * *